(12) United States Patent
Ohta et al.

(10) Patent No.: US 7,474,256 B2
(45) Date of Patent: Jan. 6, 2009

(54) POSITION DETECTING SYSTEM, AND TRANSMITTING AND RECEIVING APPARATUSES FOR THE POSITION DETECTING SYSTEM

(75) Inventors: Yoshiji Ohta, Kashiwara (JP); Keita Hara, Kashihara (JP); Masaki Hamamoto, Sakurai (JP)

(73) Assignee: Sharp Kabushiki Kaisha, Osaka (JP)

( * ) Notice: Subject to any disclaimer, the term of this patent is extended or adjusted under 35 U.S.C. 154(b) by 385 days.

(21) Appl. No.: 10/918,018

(22) Filed: Aug. 12, 2004

(65) Prior Publication Data

US 2005/0043039 A1 Feb. 24, 2005

(30) Foreign Application Priority Data

Aug. 21, 2003 (JP) ............................. 2003-297714

(51) Int. Cl.
*G01S 13/06* (2006.01)
*G01C 1/00* (2006.01)

(52) U.S. Cl. ...................... 342/146; 342/147; 356/5.01; 356/152.2

(58) Field of Classification Search ................. 342/147, 342/450, 5–12, 126, 140, 11, 25 B, 28, 47, 342/54; 455/456.1; 356/4, 152.1–152.3, 356/141, 5, 493, 3.05, 502, 9; 367/8; 398/151, 398/169; 340/853.1, 903
See application file for complete search history.

(56) References Cited

U.S. PATENT DOCUMENTS

| | | | | | |
|---|---|---|---|---|---|
| 1,981,884 | A | * | 11/1934 | Taylor et al. .................. 342/27 |
| 2,085,798 | A | * | 7/1937 | Gerhard ....................... 342/126 |
| 2,411,518 | A | * | 11/1946 | Busignies .................... 342/368 |
| 2,650,359 | A | * | 8/1953 | Brockway et al. ............ 342/450 |
| 2,982,859 | A | * | 5/1961 | Steinbrecher ................ 250/205 |
| 3,067,281 | A | * | 12/1962 | La Pierre et al. ................ 367/7 |
| 3,400,363 | A | * | 9/1968 | Silverman ....................... 367/8 |
| 3,705,261 | A | * | 12/1972 | Langley ......................... 348/42 |
| 3,846,026 | A | * | 11/1974 | Waters ..................... 356/141.3 |
| 4,184,767 | A | * | 1/1980 | Hughes et al. ............ 356/141.1 |
| 4,245,220 | A | * | 1/1981 | Johnson ....................... 342/147 |
| 4,253,166 | A | * | 2/1981 | Johnson ....................... 367/102 |
| 4,550,250 | A | * | 10/1985 | Mueller et al. ............ 250/208.2 |

(Continued)

FOREIGN PATENT DOCUMENTS

JP 59-012370 1/1984

(Continued)

OTHER PUBLICATIONS

Japanese Office Action and translation thereof.

*Primary Examiner*—Isam Alsomiri
(74) *Attorney, Agent, or Firm*—David G. Conlin; Steven M. Jensen; Edwards Angell Palmer & Dodge LLP

(57) ABSTRACT

A transmitting apparatus and a receiving apparatus of a position detecting system execute a program including the steps of transmitting a laser beam; detecting an azimuth $\alpha(Y)$ at which the laser beam is transmitted; detecting an azimuth $\beta$ at which the reflected laser beam is received; calculating a distance $L(1)$ between the transmitting apparatus and a moving body from $\alpha(Y)$, $\beta$ and a distance D between the transmitting apparatus and the receiving apparatus; and calculating a distance $L(2)$ between the receiving apparatus and the moving body.

50 Claims, 16 Drawing Sheets

U.S. PATENT DOCUMENTS

| | | | |
|---|---|---|---|
| 4,560,270 A * | 12/1985 | Wiklund et al. | 356/5.1 |
| 4,568,182 A * | 2/1986 | Modjallal | 356/3.01 |
| 4,621,267 A * | 11/1986 | Wiley | 342/462 |
| 4,688,933 A * | 8/1987 | Lapeyre | 356/3.16 |
| 4,712,915 A * | 12/1987 | Kosakowski et al. | 356/139.08 |
| 4,729,660 A * | 3/1988 | Tsumura et al. | 356/622 |
| 4,820,041 A * | 4/1989 | Davidson et al. | 356/3.12 |
| 4,912,643 A * | 3/1990 | Beirne | 702/150 |
| 5,026,153 A * | 6/1991 | Suzuki et al. | 356/3.16 |
| 5,039,217 A * | 8/1991 | Maekawa et al. | 356/3.01 |
| 5,164,732 A * | 11/1992 | Brockelsby et al. | 342/44 |
| 5,166,668 A * | 11/1992 | Aoyagi | 345/180 |
| 5,243,397 A * | 9/1993 | Friedland | 356/3.09 |
| 5,264,855 A * | 11/1993 | Lammers et al. | 342/159 |
| 5,457,394 A * | 10/1995 | McEwan | 324/642 |
| 5,465,094 A * | 11/1995 | McEwan | 342/28 |
| 5,534,868 A * | 7/1996 | Gjessing et al. | 342/26 D |
| 5,576,627 A * | 11/1996 | McEwan | 324/639 |
| 5,583,638 A * | 12/1996 | Cutler | 356/455 |
| 5,594,413 A * | 1/1997 | Cho et al. | 340/435 |
| 5,926,305 A * | 7/1999 | Ohtomo et al. | 359/196 |
| 5,974,348 A * | 10/1999 | Rocks | 701/28 |
| 5,976,038 A * | 11/1999 | Orenstein et al. | 473/467 |
| 6,137,436 A * | 10/2000 | Koch | 342/73 |
| 6,177,903 B1 | 1/2001 | Fullerton et al. | 342/28 |
| 6,278,399 B1 * | 8/2001 | Ashihara | 342/173 |
| 6,381,055 B1 * | 4/2002 | Javitt et al. | 398/131 |
| 6,459,492 B1 * | 10/2002 | Hercher | 356/622 |
| 6,492,937 B1 * | 12/2002 | Sparrow et al. | 342/125 |
| 6,650,425 B2 * | 11/2003 | Kubota et al. | 356/614 |
| 6,653,972 B1 * | 11/2003 | Krikorian et al. | 342/62 |
| 6,667,724 B2 * | 12/2003 | Barnes et al. | 343/893 |
| 6,693,714 B1 * | 2/2004 | Akikuni et al. | 356/498 |
| 6,822,604 B2 * | 11/2004 | Hall et al. | 342/28 |
| 6,906,639 B2 * | 6/2005 | Lemelson et al. | 340/903 |
| 6,914,554 B1 * | 7/2005 | Riley et al. | 342/58 |
| 7,138,938 B1 * | 11/2006 | Prakah-Asante et al. | 342/70 |
| 2001/0004288 A1 * | 6/2001 | Tsuji | 358/301 |
| 2002/0096637 A1 * | 7/2002 | Toomey | 250/341.1 |
| 2002/0097400 A1 * | 7/2002 | Jung et al. | 356/419 |
| 2002/0196176 A1 * | 12/2002 | Fullerton | 342/21 |
| 2003/0117810 A1 * | 6/2003 | Nakazawa et al. | 362/515 |
| 2003/0156420 A1 * | 8/2003 | Tatsukawa | 362/465 |
| 2004/0090626 A1 * | 5/2004 | Wielsch et al. | 356/369 |
| 2006/0169876 A1 * | 8/2006 | Zambon | 250/221 |

FOREIGN PATENT DOCUMENTS

| | | |
|---|---|---|
| JP | 60-211308 | 10/1985 |
| JP | 03-242518 | 10/1991 |
| JP | 03-295487 | 12/1991 |
| JP | 05-027036 | 2/1993 |
| JP | 06-018260 | 1/1994 |
| JP | 06-059016 | 3/1994 |
| JP | 06-317670 | 11/1994 |
| JP | 09-026474 | 1/1997 |
| JP | 2000-131059 | 5/2000 |
| JP | 2002-181925 | 6/2002 |

* cited by examiner

F I G. 5 A
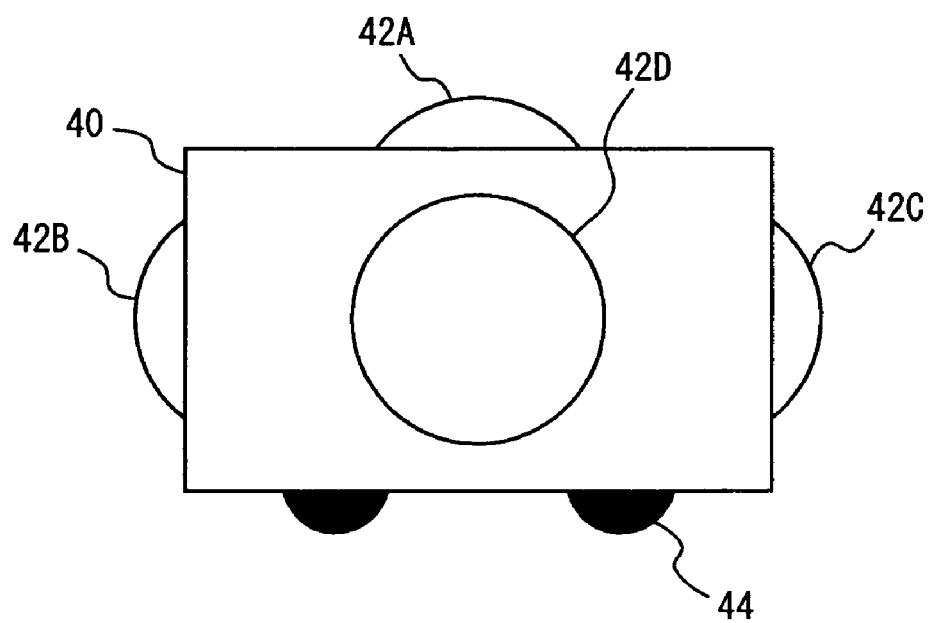
F I G. 5 B
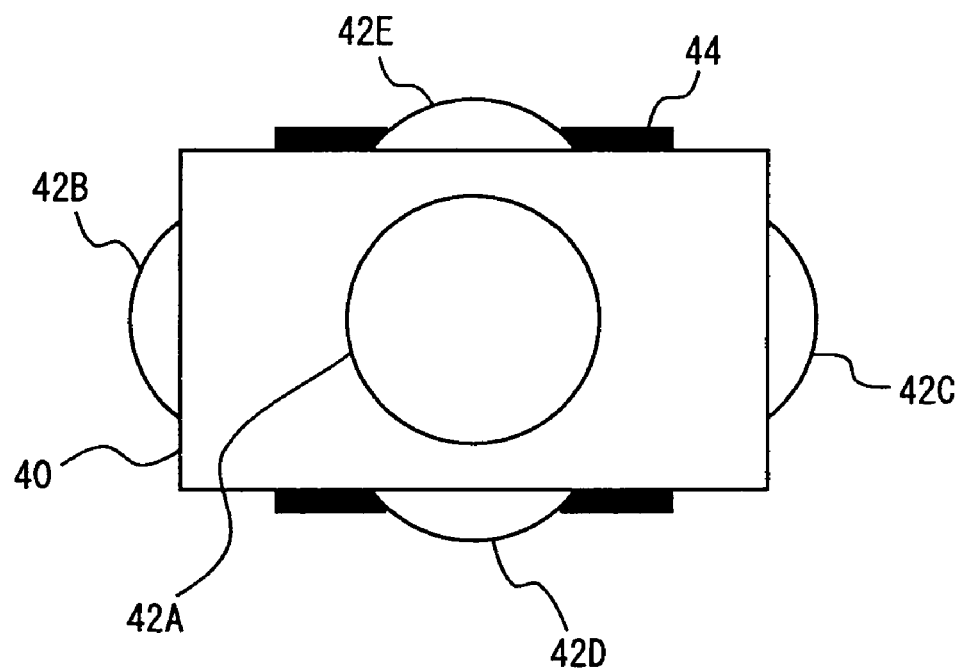

F I G. 7
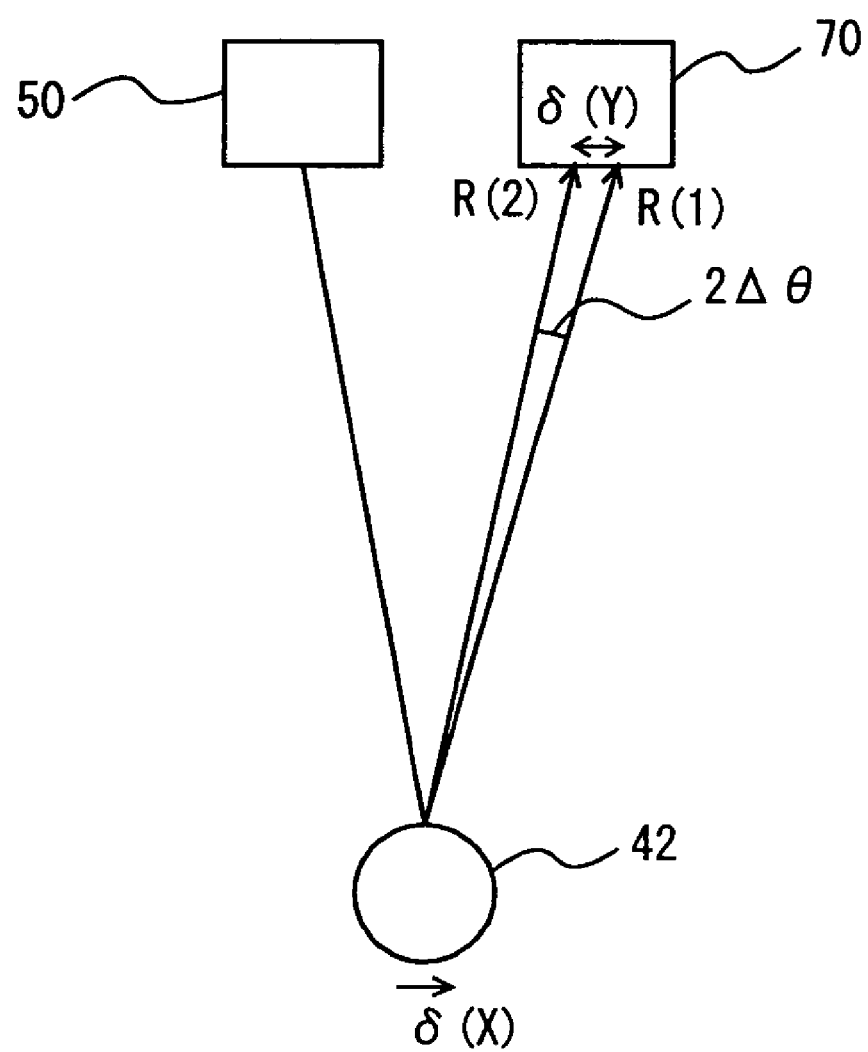

POSITION DETECTING SYSTEM, AND TRANSMITTING AND RECEIVING APPARATUSES FOR THE POSITION DETECTING SYSTEM

This nonprovisional application is based on Japanese Patent Application No. 2003-297714 filed with the Japan Patent Office on Aug. 21, 2003, the entire contents of which are hereby incorporated by reference.

BACKGROUND OF THE INVENTION

1. Field of the Invention

The present invention relates to a position detecting system and to transmitting and receiving apparatuses for the position detecting system. More specifically, the present invention relates to a position detecting system for detecting a position of a moving body including a reflector reflecting a wave propagated through a space, and to transmitting and receiving apparatuses for the position detecting system.

2. Description of the Background Art

Conventionally, a position measuring apparatus for measuring a position of a moving body and a distance measuring apparatus for measuring a distance from a moving body have been known. In these apparatuses, light such as a laser beam is directed to the moving body, and the position of or distance to the moving body is measured using an incident angle of light reflected from a reflector provided on the moving body.

Japanese Patent Laying-Open No. 06-059016 discloses a position measuring device for a moving body that attains highly accurate measurement without requiring a preliminary measuring of the position of the reflector and registering the position in a circuit. In the position measuring device disclosed in this laid-open application, a light beam is emitted in rotary scanning manner from a moving body, light reflected from at least three optical reflectors arranged separately from the moving body is detected by the moving body, and based on the positions of respective optical reflectors and open-angle between each of the optical reflectors, the present position of the moving body is measured. The device includes: an optical detecting portion detecting an incident angle $\theta(1)$ of the light reflected from each of the reflectors on the moving body in a state that the moving body is placed on a first reference position and detecting an incident angle $\theta(2)$ of the light reflected from each of the reflectors on the moving body in a state that the moving body is placed on a second reference position away from the first reference position; and a calculating portion calculating the position of each of the reflectors based on an interval a between the first and second reference positions and on the incident angles $\theta(1)$ and $\theta(2)$ from each of the reflectors at both reference positions.

According to the invention disclosed in this laid-open application, for measuring the position of the moving body, first, at least three optical reflectors are installed at arbitrary positions on a plane on which the moving body moves. The moving body is placed on the first reference position, and in this state, the moving body emits a light beam in rotary scanning manner, and receives light reflected from each of the reflectors. As a result, the incident angle $\theta(1)$ of the reflected light on the moving body at the first reference position from each reflector is detected. Thereafter, the moving body is placed on the second reference position, and in this state, the moving body emits a light beam in rotary scanning manner and receives light reflected from each of the reflectors. As a result, the incident angle $\theta(2)$ of the reflected light on the moving body at the second reference position from each reflector is detected. Here, the interval a between the first and second reference positions can be set sufficiently smaller than the distance between each of the optical reflectors, and the interval can be measured with high accuracy by a well-known distance measuring means such as a rotary encoder provided on the moving body. Next, based on the measurements of incident angles $\theta(1)$ and $\theta(2)$, position of each optical reflector is calculated. At this time, the position of an arbitrary one of the optical reflectors is defined by the interval a between the two reference positions and two incident angles $\theta(1)$ and $\theta(2)$, and therefore, X-Y coordinates of the optical reflector can be calculated based on these data. Thereafter, position measurement of the moving body starts, in which light reflected from each of the reflectors is detected while rotary scanning of light beam takes place, and based on the position (X-Y coordinates) of each reflector and on the open-angle between each of the reflectors, the present position of the moving body is calculated. As a result, before measuring the position of moving body, the position of each reflector is measured with high accuracy by optical measurement, and the position of moving body is calculated based on the measurement data. Therefore, a highly accurate result of measurement can be obtained. Further, it is unnecessary to measure and register the position of optical reflectors.

Japanese Patent Laying-Open No. 06-317670 discloses an inter-vehicle distance measuring device having simple structure and capable of computing inter-vehicle distance in a short period of time, without requiring any human intervention such as visual estimation. The inter-vehicle distance measuring device described in this laid-open application includes an inter-vehicle distance calculating portion, which includes two sets of the following components: a laser beam transmitting portion transmitting a laser beam in a direction forward of the vehicle; a sweeping portion sweeping the laser beam; a laser beam receiving portion receiving the laser beam that has been transmitted from the laser beam transmitting portion and reflected by a reflector attached to the rear end of a vehicle in front; and an angle detecting portion detecting an angle at which the reflector exists, from the direction of arrival of the signal received by the laser beam receiving portion. The inter-vehicle distance calculating portion as such calculates the distance from the preceding vehicle from the angles detected by the two angle detecting portions respectively and an interval between the two laser beam transmitting portions stored in advance in a memory.

According to the invention disclosed in this laid-open application, a beam such as a laser beam is directed to a reflector at a rear end of a preceding vehicle, the direction where the reflector exists is detected, and based on this angle and the interval from the reflector, the inter-vehicle distance is measured. Therefore, different from the conventional measurement of inter-vehicle distance based on visual estimation, the inter-vehicle distance can be calculated with far higher accuracy. Further, two laser beam transmitting portions are provided on the vehicle, which are used independently to find the angle at which the reflector of a preceding vehicle exists. Therefore, even a distance from a preceding vehicle having only one reflector such as a motorcycle can accurately be calculated.

In the position measuring device described in Japanese Patent Laying-Open No. 06-059016, however, the light reflected from the reflector is detected on the moving body, and therefore, it is necessary to install the reflectors in advance. Accordingly, the position of the moving body can be measured only in a limited space, and the position of a moving body moving in an arbitrary place cannot be measured.

In the position measuring device described in Japanese Patent Laying-Open No. 06-317670, two laser beam receiving portions receive reflected light beams respectively, to detect the angle at which the reflector exists. This means that angle detection using reflected beam is performed twice. Typically, a light beam, including a laser beam, deflects as it proceeds through a space. Therefore, it follows that when the angle at which a reflector exists is to be detected by using the reflected light beam, there is an error resulting from the deflection. Accordingly, the position measuring device described in Japanese Patent Laying-Open No. 06-317670 involves twice the error resulting from the deflection, and hence, the measurement comes to have a considerable error.

SUMMARY OF THE INVENTION

An object of the present invention is to detect a position of a moving body moving in an arbitrary place with a small error.

Another object of the present invention is to constantly detect the position of the moving body.

A further object of the present invention is to quickly detect the position of the moving body.

A still further object of the present invention is to search for the moving body when the position of the moving body is not detected.

A still further object of the present invention is to calculate an amount of movement of the moving body.

A still further object of the present invention is to detect rotary movement of the moving body.

According to an aspect, the present invention provides a position detecting system including a transmitting apparatus, a receiving apparatus, and a moving body of which position is detected by using these apparatuses. The moving body includes a reflector that reflects a wave propagating through a space. The transmitting apparatus includes a transmitting portion transmitting the wave, and a detecting portion detecting the direction of transmission of the wave. The receiving apparatus includes a receiving portion receiving the reflected wave, that is, the wave reflected by the reflector, and a direction detecting portion detecting the direction of reception of the reflected wave. The transmitting apparatus and the receiving apparatus are provided apart from each other. At least one of the transmitting apparatus, receiving apparatus and the moving body detects the position of the moving body, based on the direction of wave transmission, direction of reflected wave reception and the distance between the transmitting and receiving apparatuses.

According to the present invention, the transmitting apparatus transmits the wave, and detects the direction of wave transmission. The receiving apparatus receives the reflected wave, that is, the wave reflected by the reflector, and detects the direction of reflected wave reception. The transmitting apparatus and the receiving apparatus are provided apart from each other, and at least one of the transmitting apparatus, receiving apparatus and the moving body detects the position of the moving body, based on the direction of wave transmission, direction of reflected wave reception and the distance between the transmitting and receiving apparatuses. Therefore, the direction of wave transmission, that is, the direction of the moving body relative to the transmitting apparatus, can be detected without receiving the wave. Further, the direction of receiving the reflected wave, that is, the direction of the moving body relative to the receiving apparatus is detected by receiving the wave. Thus, the wave has to be received only once to detect the direction of the moving body, and the error results from the wave only once in detecting the portion of the moving body. At this time, as the wave is reflected by the reflector attached to the moving body, the reflector moves together with the moving body. As a result, a position detecting system can be provided, by which the position of the moving body moving in an arbitrary place can be detected with a small error.

More preferably, the transmitting apparatus and the receiving apparatus are provided spaced apart by a predetermined distance from each other.

According to the present invention, as the transmitting apparatus and the receiving apparatus are provided spaced apart by a predetermined distance from each other, the distance between the transmitting and receiving apparatuses does not change. Thus, it becomes unnecessary to measure the distance between the transmitting and receiving apparatuses by, for example, a separate sensor. Thus, error in distance between the transmitting and receiving apparatuses can be avoided in detecting the position of the moving body.

More preferably, at least one of the transmitting apparatus and the receiving apparatus further includes a moving portion, and at least one of the position and orientation of the moving portion may be changed.

According to the present invention, at least one of the transmitting apparatus and the receiving apparatus may have at least one of its position and orientation changed. Therefore, even if the receiving apparatus fails to receive the reflected wave as the amount of movement of the moving body is too large or the moving body, transmitting apparatus and the receiving apparatus happen to be positioned on a line, it is possible to have the position or orientation of the transmitting apparatus or the receiving apparatus changed, so that the receiving apparatus can receive the reflected wave. As a result, the position of the moving body can always be detected.

More preferably, the moving portion is a three-dimensional moving portion that can move in a space three-dimensionally.

According to the present invention, at least one of the transmitting apparatus and the receiving apparatus can move three-dimensionally. Therefore, no matter how the moving body moves in the space, it is possible to track three-dimensionally and to detect the position of the moving body.

More preferably, the moving portion includes a first moving portion that changes at least one of the position and orientation of the transmitting apparatus, and a second moving portion that changes at least one of the position and orientation of the receiving apparatus. Each of the transmitting and receiving apparatuses includes a transmitting and receiving portion for transmitting and receiving information related to the result of detection to and from each other.

According to the present invention, each of the transmitting and receiving apparatuses can move, and the information related to the result of detection can be transmitted and received to and from each other. Accordingly, it is possible, for example, to move based on the result of detection by the other apparatus. Thus, no matter how the moving body moves, it can surely be tracked and the position of the moving body can be detected.

More preferably, each of the transmitting and receiving apparatuses further includes a position detecting portion detecting the position of itself, and a transmitting and receiving portion transmitting and receiving position information to and from each other.

According to the present invention, the transmitting and receiving apparatuses are capable of detecting the positions of themselves and of transmitting and receiving positional information to and from each other. Accordingly, it is possible, for example, to calculate the distance between the transmitting apparatus and the receiving apparatus from the positions of the transmitting and receiving apparatuses. Therefore, even when the transmitting apparatus and the receiving apparatus move arbitrarily, the position of the moving body can surely be detected. In addition, it is possible to move the transmitting and receiving apparatuses such that the positions do not overlap with each other.

More preferably, the transmitting portion includes a directional wave transmitting portion transmitting a directional wave. The receiving portion includes a directional wave receiving portion receiving the directional wave. The direction detecting portion includes a directional wave direction detecting portion detecting the direction of receiving the reflected wave of the directional wave.

According to the present invention, the wave has directivity, and proceeds linearly. Therefore, it is possible to accurately detect the direction of the moving body relative to the transmitting apparatus and the direction of the moving body relative to the receiving apparatus.

More preferably, the receiving apparatus further includes a non-directional wave transmitting portion transmitting a non-directional wave. The transmitting apparatus further includes a non-directional wave receiving portion receiving the reflected non-directional wave reflected by the reflector, and a non-directional wave direction detecting portion detecting the direction of receiving the reflected non-directional wave.

According to the present invention, the receiving apparatus transmits a non-directional wave, and the transmitting apparatus receives the reflected non-directional wave reflected by the reflector and detects its direction. Accordingly, when the position of the moving body is not detected, for example, it is possible to transmit a non-directional wave and to detect the direction of receiving the reflected wave thereof, so as to detect the direction of the moving body relative to the transmitting apparatus. Thus, using the non-directional wave, the position of the moving body can quickly be searched. By transmitting a directional wave in the same direction as the direction of receiving the reflected non-directional wave, accurate position of the moving body can be detected. As a result, the position of the moving body can accurately and quickly be detected.

More preferably, there are a plurality of directional wave receiving portions and non-directional wave receiving portions. The directional wave direction detecting portion includes a first receiving direction detecting portion detecting the direction of receiving the reflected directional wave by each of the directional wave receiving portions, and a first average direction detecting portion detecting a first average direction as an average of the directions at which the reflected directional wave is received by the directional wave receiving portions. The non-directional wave direction detecting portion includes a second receiving direction detecting portion detecting the direction of receiving the reflected non-directional wave by each of the non-directional wave receiving portions, and a second average direction detecting portion detecting a second average direction as an average of the directions at which the reflected non-directional wave is received by each of the non-directional wave receiving portions. Each of the non-directional wave receiving portions is arranged such that the second average direction matches the direction of the reflector relative to the directional wave transmitting portion. Each of the directional wave receiving portions is arranged such that the first average direction matches the direction of the reflector relative to the non-directional wave transmitting portion.

According to the present invention, the directional wave direction detecting portion detects the direction of receiving the reflected directional wave by each of the directional wave receiving portions, and the first average direction as an average of these directions. The non-directional wave direction detecting portion detects the direction of receiving the reflected non-directional wave by each of the non-directional wave receiving portions, and the second average direction as an average of these directions. Each non-directional wave receiving portion is arranged such that the second average direction matches the direction of the reflector relative to the directional wave transmitting portion. Each directional wave receiving portion is arranged such that the first average direction matches the direction of the reflector relative to the directional wave transmitting portion. Accordingly, it is possible to detect the direction of the reflector relative to the directional wave transmitting portion, as the second average direction. Therefore, when the direction of receiving the reflected non-directional wave is to be detected, it is possible to consider that the directional wave transmitting portion and the non-directional wave receiving portion are arranged at the same position. Further, the direction of the reflector relative to the directional wave transmitting portion can be detected as the first average direction. Therefore, when the direction of receiving the reflected directional wave is to be detected, it is possible to consider that the directional wave receiving portion and the non-directional wave transmitting portion are arranged at the same position.

More preferably, the transmitting portion transmits the wave in a predetermined scope.

According to the present invention, the wave is transmitted to the predetermined scope. Therefore, when the position of the moving body is not detected and it is impossible to transmit the wave accurately to the moving body, the wave may be transmitted in the predetermined scope to search for the moving body.

More preferably, the receiving apparatus includes a preventing portion preventing direct reception of the wave transmitted from the transmitting apparatus.

According to the present invention, direct reception of the wave transmitted from the transmitting apparatus is prevented, and only the reflected wave can be received. Therefore, erroneous detection of the position of the moving body relative to the receiving apparatus caused by the direct reception of the wave can be prevented. Thus, the position of the moving body can accurately be detected.

More preferably, the present invention includes a determining portion determining whether the wave is a reflected wave or not.

According to the present invention, it is possible to determine whether the received wave is a direct wave or a reflected wave. Therefore, erroneous detection of the position of the moving body relative to the receiving apparatus caused by the direct reception of the wave can be prevented. Thus, the position of the moving body can accurately be detected.

More preferably, the receiving apparatus further includes a moving amount detecting portion detecting the amount of movement of the reflected wave. At least one of the transmitting apparatus, receiving apparatus and the moving body further includes a calculating portion calculating the amount of movement of the moving body from the amount of movement of the reflected wave.

According to the present invention, the amount of movement of the moving body can be calculated from the amount of movement of the reflected wave.

More preferably, the transmitting apparatus further includes a changing portion changing the direction of transmitting the wave.

According to the present invention, as the moving body moves, the direction of transmitting the wave can be changed. Therefore, even when the position of the moving body changes, it is possible to detect the position of the moving body by changing the direction of wave transmission.

More preferably, the moving body is provided with a plurality of reflectors. The transmitting portion transmits the wave separately to each of the reflectors. The receiving portion receives separately the reflected wave reflected by each of the reflectors.

According to the present invention, the moving body is provided with a plurality of reflectors, the wave is transmitted separately to each of the reflectors, and the reflected wave reflected by each of the reflectors is received separately. Accordingly, when the position of the moving body is not changed but the moving body rotates, the rotation of the moving body can be detected as a change in position of the reflector, as at least one of the reflectors has its position changed.

More preferably, the reflector has a curvature.

According to the present invention, the reflector has a curvature, and therefore, the amount of movement of the reflected wave resulting from the movement of the moving body is enlarged than the amount of movement of the moving body. Therefore, even when the moving body moves slightly and the amount of slight movement cannot directly be detected, the movement of the moving body can be detected by detecting the amount of movement of the reflected wave. As a result, the amount of movement of the moving body can be detected with high precision. Further, even when the moving body moves parallel to the reflecting surface of the reflector, the direction of the reflected wave changes, and therefore, the movement of the moving body can surely be detected.

More preferably, the reflector has a spherical shape.

According to the present invention, as the reflector is spherical, the wave can be reflected no matter from which direction the wave is transmitted.

More preferably, the reflector has a cylindrical shape.

According to the present invention, as the reflector is cylindrical, the wave can be reflected no matter from which direction on a plane the wave is transmitted.

More preferably, the reflector is a part of a spherical surface.

According to the present invention, the reflector is a part of a spherical surface, and therefore, the reflector may have any radius of curvature without changing the diameter of the reflector. Thus, the ratio of enlarging the amount of movement of the reflector with respect to the amount of movement of the moving body can be set arbitrarily.

More preferably, the reflector is a part of a cylindrical surface.

According to the present invention, as the reflector is a part of a cylindrical surface, reflector may have any radius of curvature without changing the diameter of the reflector. Thus, the ratio of enlarging the amount of movement of the reflector with respect to the amount of movement of the moving body can be set arbitrarily.

More preferably, the radius of curvature of the reflector changes portion to portion.

According to the present invention, the radius of curvature of the reflecting body changes portion to portion, and therefore, when the amount of movement of the moving body is constant, it is possible to detect at which portion of the reflector the wave is reflected, from the change in the amount of movement of the reflected wave detected by the receiving apparatus. As a result, the position of which relative position to the reflector has been known, such as the position of the center of the moving body, can accurately be detected.

More preferably, the surface of the reflector has a parabolic shape.

According to the present invention, as the surface of the reflector has a parabolic shape, the curvature of the reflector changes portion to portion. Therefore, when the amount of movement of the moving body is constant, at which portion of the reflector the wave is reflected can be found from the variation in the amount of movement of the reflected wave detected by the receiving apparatus. As a result, the position of which relative position to the reflector has been known, such as the central position of the moving body, can accurately be detected.

More preferably, the reflector has a shape of an elliptical cylinder.

According to the present invention, as the surface of the reflector has a shape of an elliptical cylinder, the curvature of the reflector changes portion to portion. Therefore, when the amount of movement of the moving body is constant, at which portion of the reflector the wave is reflected can be found from the variation in the amount of movement of the reflected wave detected by the receiving apparatus. As a result, the position of which relative position to the reflector has been known, such as the central position of the moving body, can accurately be detected.

According to another aspect, the transmitting apparatus of the present invention is a transmitting apparatus in a position detecting system.

According to the present invention, a transmitting apparatus for a position detecting system that can detect a position of a moving body moving in an arbitrary space with a small error can be provided.

According to a still another aspect, the receiving apparatus of the present invention is a receiving apparatus in a position detecting system.

According to the present invention, a receiving apparatus for a position detecting system that can detect a position of a moving body moving in an arbitrary space with a small error can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5A and 5B are a side view and a plan view of the moving body.

FIGS. 7 and 8 represent how a position detecting system in accordance with a second embodiment of the present invention tracks a moving body.

DESCRIPTION OF THE PREFERRED EMBODIMENTS

Figure 1:
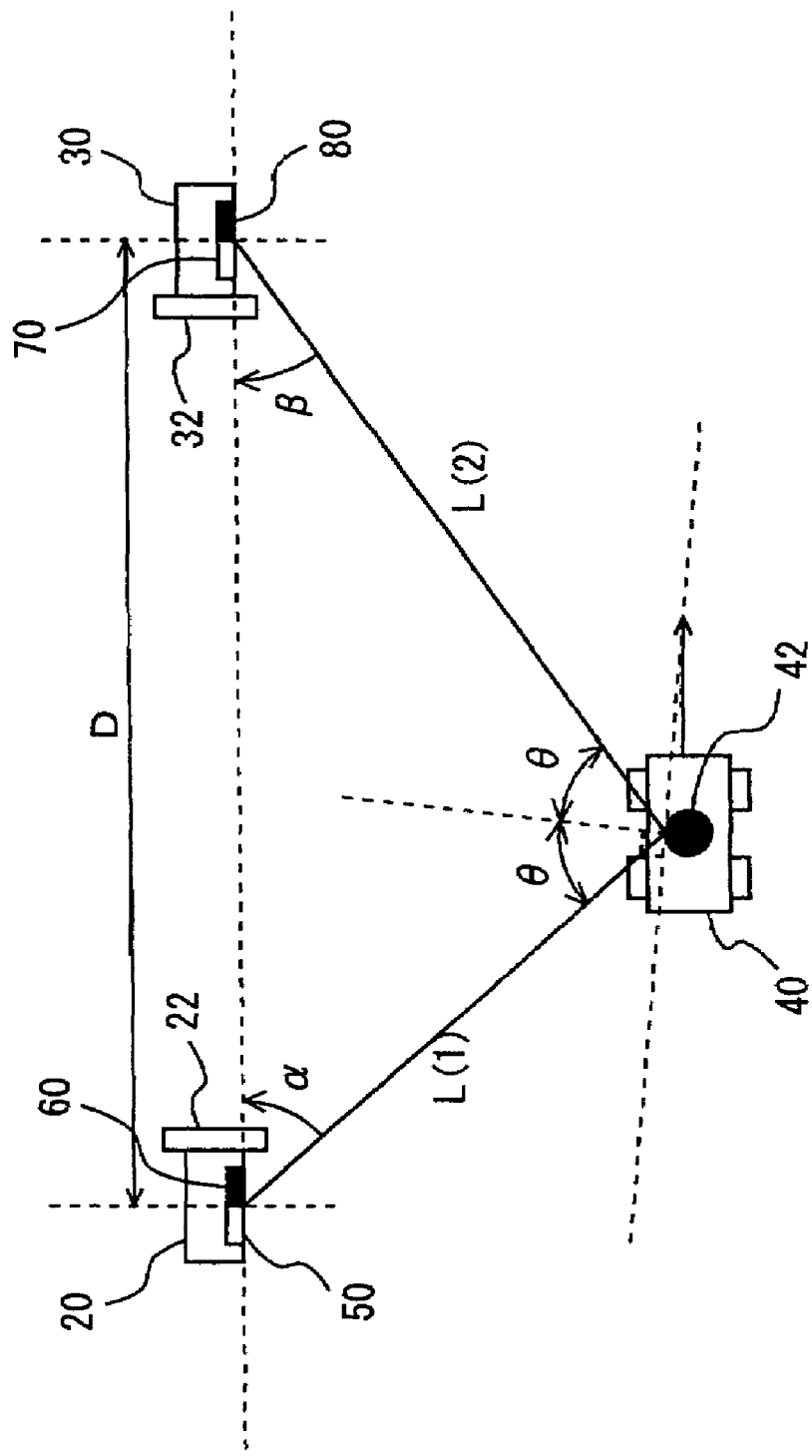
FIG. 1 represents a position detecting system and a moving body in accordance with a first embodiment of the present invention.

In the following, an embodiment of the present invention will be described with reference to the figures. In the following description, the same components are denoted by the same reference characters, and they have the same names and same functions. Therefore, detailed description thereof will not be repeated.

First Embodiment

Referring to FIG. 1, the position detecting system in accordance with the first embodiment of the present invention includes a transmitting apparatus 20 transmitting a laser beam, and a receiving apparatus 30 provided separate from transmitting apparatus 20. The position detecting system detects the position of a moving body 40 having a reflector 42, using transmitting apparatus 20 and receiving apparatus 30. Specifically, an azimuth $\alpha$ between transmitting apparatus 20 and moving body 40 (reflector 42), and an azimuth $\beta$ between receiving apparatus 30 and moving body 40 (reflector 42) are detected. From these azimuths and a distance D between transmitting apparatus 20 and receiving apparatus 30, a distance L(1) between transmitting apparatus 20 and moving body 40 (reflector 42) and a distance L(2) between receiving apparatus 30 and moving body 40 (reflector 42) are calculated.

The distance L(1) between transmitting apparatus 20 and moving body 40 (reflector 42) is, by triangulation, L(1)=D·sin $\beta$/sin ($\alpha$+$\beta$). The distance L(2) between transmitting apparatus 30 and moving body 40 (reflector 42) is L(2)=D·sin $\alpha$/sin ($\alpha$+$\beta$).

Transmitting apparatus 20 includes a shielding plate 22, a laser transmitter 50, and a halogen light receiver 60. Laser transmitter 50 transmits a laser beam, which is a directional wave, to reflector 42 of moving body 40. Halogen light receiver 60 receives reflected light of halogen, which is a non-directional wave. Shielding plate 22 shields direct halogen light so that halogen light receiver 60 receives only the reflected halogen light.

Receiving apparatus 30 includes a shielding plate 32, a laser receiver 70, and a halogen light transmitter 80. Laser receiver 70 receives the laser beam reflected from reflector 42 of moving body 40. Halogen light transmitter 80 transmits non-directional halogen light. Shielding plate 32 shields a direct laser beam so that laser receiver 70 receives only the reflected laser beam.

In the position detecting system in accordance with the present embodiment, first, as a primary detection, the non-directional halogen light is transmitted from halogen light transmitter 80. The reflected light thereof is detected by halogen light receiver 60. Thus, an azimuth $\alpha$(X) at which the halogen light is received is detected. Next, as a secondary detection, laser transmitter 50 transmits a laser beam at an angle that is the same as azimuth $\alpha$(X). Thus, an azimuth $\alpha$(Y) of transmitting a laser beam is detected. Further, the reflected laser beam is detected by laser receiver 70. Thus, an azimuth $\beta$ of receiving the laser beam is detected. As non-directional halogen light is used for the primary detection, azimuth $\alpha$(X) between transmitting apparatus 20 and moving body 40 can be detected, even when the position of moving body 40 is uncertain. The detected azimuth $\alpha$(X), however, involves an error inherently generated as the halogen light proceeds through a space, as the azimuth is detected by receiving a reflected light. Therefore, as the secondary detection, a laser beam is transmitted, and an azimuth $\alpha$(Y) of laser transmission and an azimuth $\beta$ of laser reception are detected. Here, the azimuth $\beta$ is detected by receiving the reflected beam, and therefore, it involves an error generated when the laser beam that has been propagated through a space is received. The azimuth $\alpha$(Y), however, is detected not by receiving the laser, and hence, it is free of any error generated when the laser beam that has been propagated through a space is received. In the position detecting system in accordance with the present embodiment, the azimuth $\alpha$(Y) is used for detecting the position of moving body 40.

In the present embodiment, a laser beam is used as a directional wave, while halogen light is used as non-directional wave. In place of these, other waves such as an acoustic wave, ultrasonic wave and electromagnetic wave may be used. Further, a general fluorescent lamp or an electric lamp may be used for generating non-directional wave.

Figure 2:
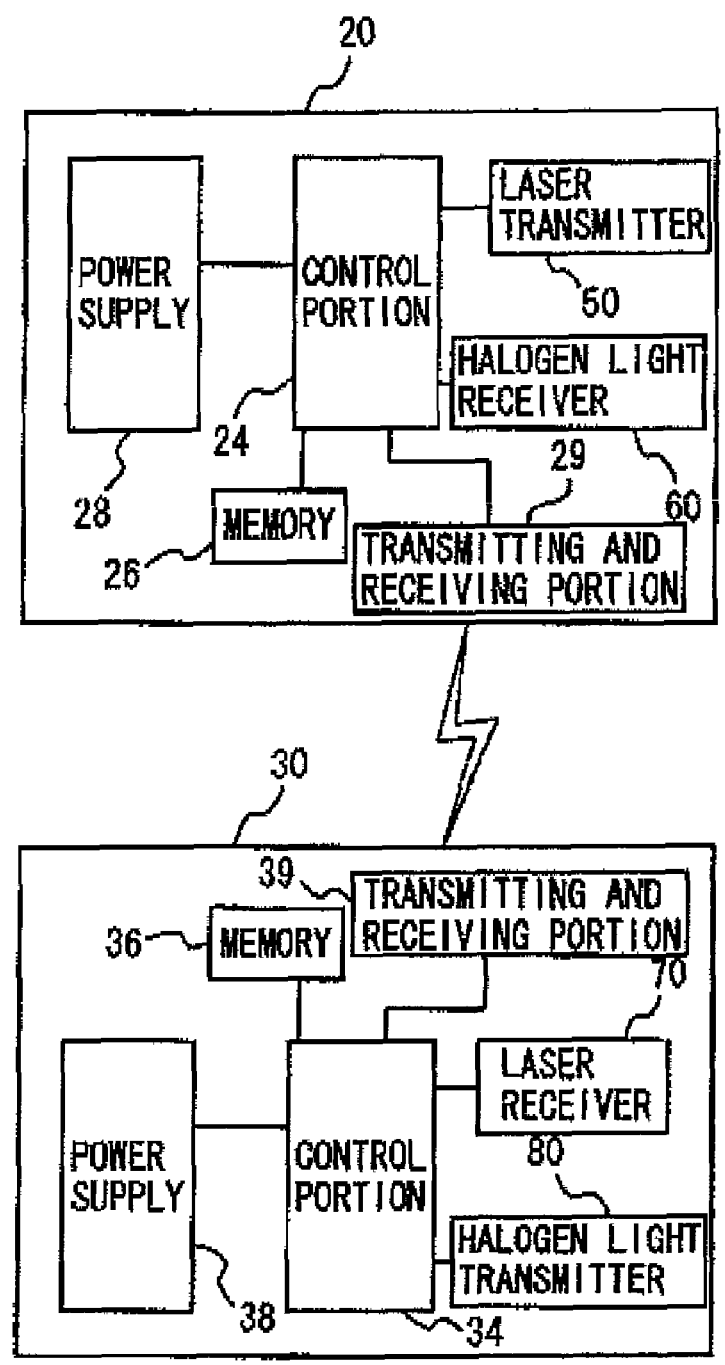
FIG. 2 is a control block diagram of transmitting and receiving apparatuses of the position detecting system in accordance with the first embodiment of the present invention.

Referring to FIG. 2, transmitting apparatus 20 and receiving apparatus 30 will be described in grater detail. Transmitting apparatus 20 includes a control portion 24, a memory 26, a power supply portion 28, and a transmitting and receiving portion 29. Control portion 24 is connected to laser transmitter 50 and halogen light receiver 60 and controls operations thereof. Memory 26 stores a program to be executed by transmitting apparatus 20, distance D between transmitting apparatus 20 and receiving apparatus 30, and so on. Transmitting and receiving portion 29 transmits and receives information related to the result of detection and result of calculation with respect to moving body 40, to and from receiving apparatus 30.

Receiving apparatus 30 includes a control portion 34, a memory 36, a power supply portion 38 and a transmitting and receiving portion 39. Control portion 34 is connected to laser receiver 70 and halogen light transmitter 80 and controls operations thereof. Memory 36 stores a program to be executed by receiving apparatus 30, distance D between transmitting apparatus 20 and receiving apparatus 30, and so on. Transmitting and receiving portion 39 transmits and receives information related to the result of detection and result of calculation with respect to moving body 40, to and from transmitting apparatus 20.

Figure 3A:
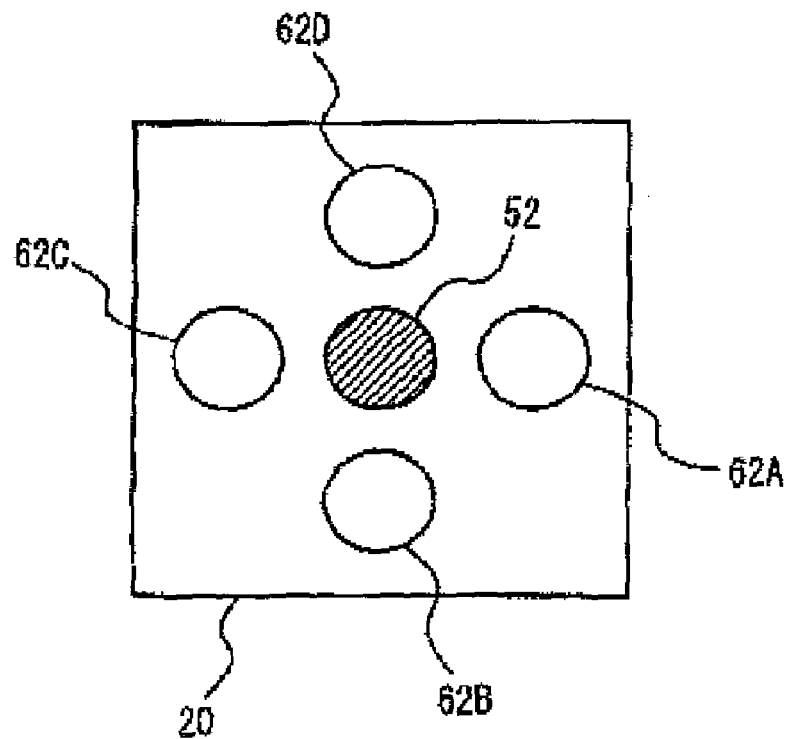
FIGS. 3A and 3B represent positional relation between a laser transmitter and halogen receivers provided on a transmitting apparatus, and positional relation between a halogen transmitter and laser receivers provided on a receiving apparatus.

As shown in FIG. 3A, the transmitting apparatus 20 includes a laser transmitting portion 52 for transmitting a laser beam. The halogen light receiver includes four halogen light receiving portions 62A, 62B, 62C and 62D that receive the halogen light. The halogen light receiving portions are arranged in an array (lattice) surrounding laser transmitting portion 52 such that an average azimuth of azimuths at which reflected halogen light is received by the respective halogen light receiving portions match the azimuth $\alpha$ between laser transmitting portion 52 (transmitting apparatus 20) and moving body 40 (see FIG. 1). Arrangement of respective halogen light receiving portions may be in point-symmetry or line-symmetry with laser transmitting portion 52 being the center.

Figure 3B:
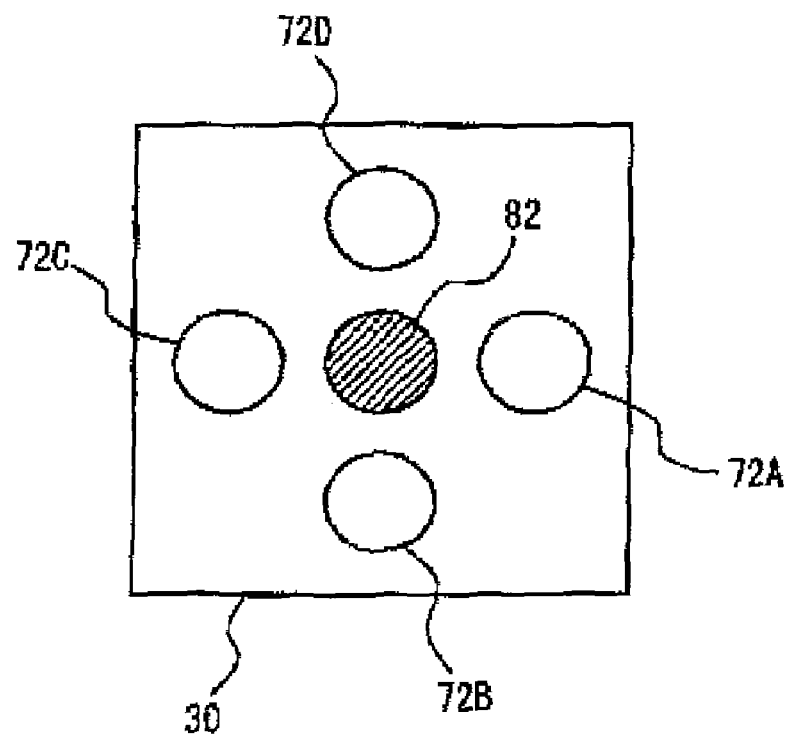

As shown in FIG. 3B, the receiving apparatus 30 includes four laser beam receiving portions 72A, 72B, 72C and 72D receiving the reflected laser beam. The halogen light transmitter includes a halogen light transmitting portion 82 transmitting the halogen light. The laser beam receiving portions are arranged in an array (lattice) surrounding halogen light transmitting portion 82 such that an average azimuth of azimuths at which reflected laser beam is received by the respective laser receiving portions match the azimuth $\beta$ between halogen light transmitting portion 82 (receiving apparatus 30) and moving body 40 (see FIG. 1). Arrangement of respective laser receiving portions may be in point-symmetry or line-symmetry with halogen light transmitting portion 82 being the center.

In the position detecting system of the present embodiment, the azimuth as an average of azimuths at which the reflected halogen light is received by respective halogen light receiving portions is used as the azimuth $\alpha(X)$ to be detected by the primary detection described above. Further, the azimuth as an average of azimuths at which the reflected laser beam is received by respective laser receiving portions is used as the azimuth $\beta$ to be detected by the secondary detection described above. Specifically, the halogen light transmitted from halogen light transmitting portion 82 in the primary detection is reflected by reflector 42, and enters laser transmitting portion 52 and respective halogen light receiving portions. At this time, azimuth $\alpha(X)$ at which the reflected halogen light is incident on laser transmitting portion 52 can be detected as an average of azimuths at which reflected halogen light is received by the respective halogen light receiving portions. When the laser beam is transmitted with the same azimuth as $\alpha(X)$, the laser beam proceeds along the same optical path as the halogen light, reflected by reflector 42 and the reflected laser beam enters halogen light transmitting portion 82 and the respective laser receiving portions. Of these, azimuth $\beta$ at which the reflected laser beam is incident on halogen light transmitting portion 82 can be detected as an average of azimuths at which reflected laser beam is received by respective laser receiving portions. As the azimuths $\alpha(X)$ and $\beta$ are detected in this manner, it becomes possible to consider that laser transmitter 50 and halogen light receiver 60 are arranged at the same position, and therefore, it becomes possible to consider that laser receiver 70 and halogen light transmitter 80 are arranged at the same position.

Figure 4A:
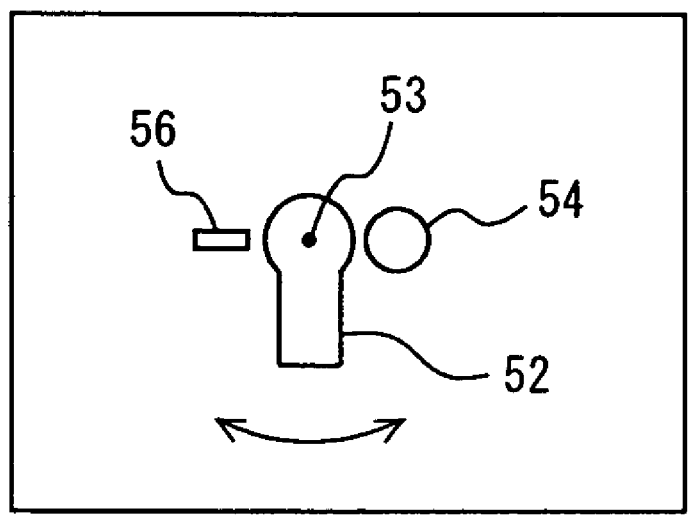
FIGS. 4A and 4B represent inner configurations of a laser transmitting portion of the laser transmitter and a laser receiving portion of the laser receiver.
Figure 4B:
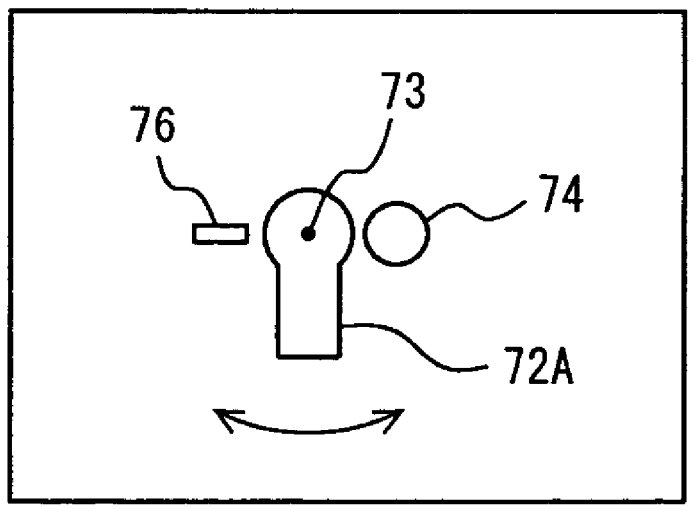

Referring to FIGS. 4A and 4B, laser transmitter 52 and laser receiving portion 72A will be described in detail. The laser receiving portions other than laser receiving portion 72A and the halogen light receiving portions all have the same structure as laser receiving portion 72A, and therefore, detailed description thereof will not be repeated.

As shown in FIG. 4A, laser transmitting portion 52 is supported rotatable about a rotation axis 53. Laser transmitter 52 is rotated by a motor 54 to transmit the laser beam in a desired direction. The angle of laser transmitter 50 is detected by an angle sensor 56. The angle detected by sensor 56 will be the azimuth $\alpha(Y)$ between transmitting apparatus 20 and moving body 40.

As shown in FIG. 4B, laser receiving portion 72A is supported rotatable about a rotation axis 73. Laser receiving portion 72A is rotated by motor 74 to receive the laser beam reflected by reflector 42. The angle of laser receiver 72 is detected by an angle sensor 76. An average angle of angles detected by angle sensors for the respective laser receiving portions will be the azimuth $\beta$ between receiving apparatus 30 and moving body 40. The average angle of angles detected by the respective halogen light receiving portions will be the azimuth $\alpha(X)$ between transmitting apparatus 20 and moving body 40.

Referring to FIGS. 5A and 5B, moving body 40 will be described. FIG. 5A is a side view of moving body 40 viewed from one side. FIG. 5B is a plan view of moving body 40 viewed from above. Moving body 40 includes five reflectors reflecting the laser beam and the halogen light. The reflectors are provided on front and rear surfaces, on opposing side surfaces and on an upper surface of moving body 40. Each reflector is formed of a part of a spherical surface, and has a prescribed radius of curvature. Moving body 40 has wheels 44 at is lower surface. Moving body 40 moves to an arbitrary location by the wheels 44.

Figure 6:
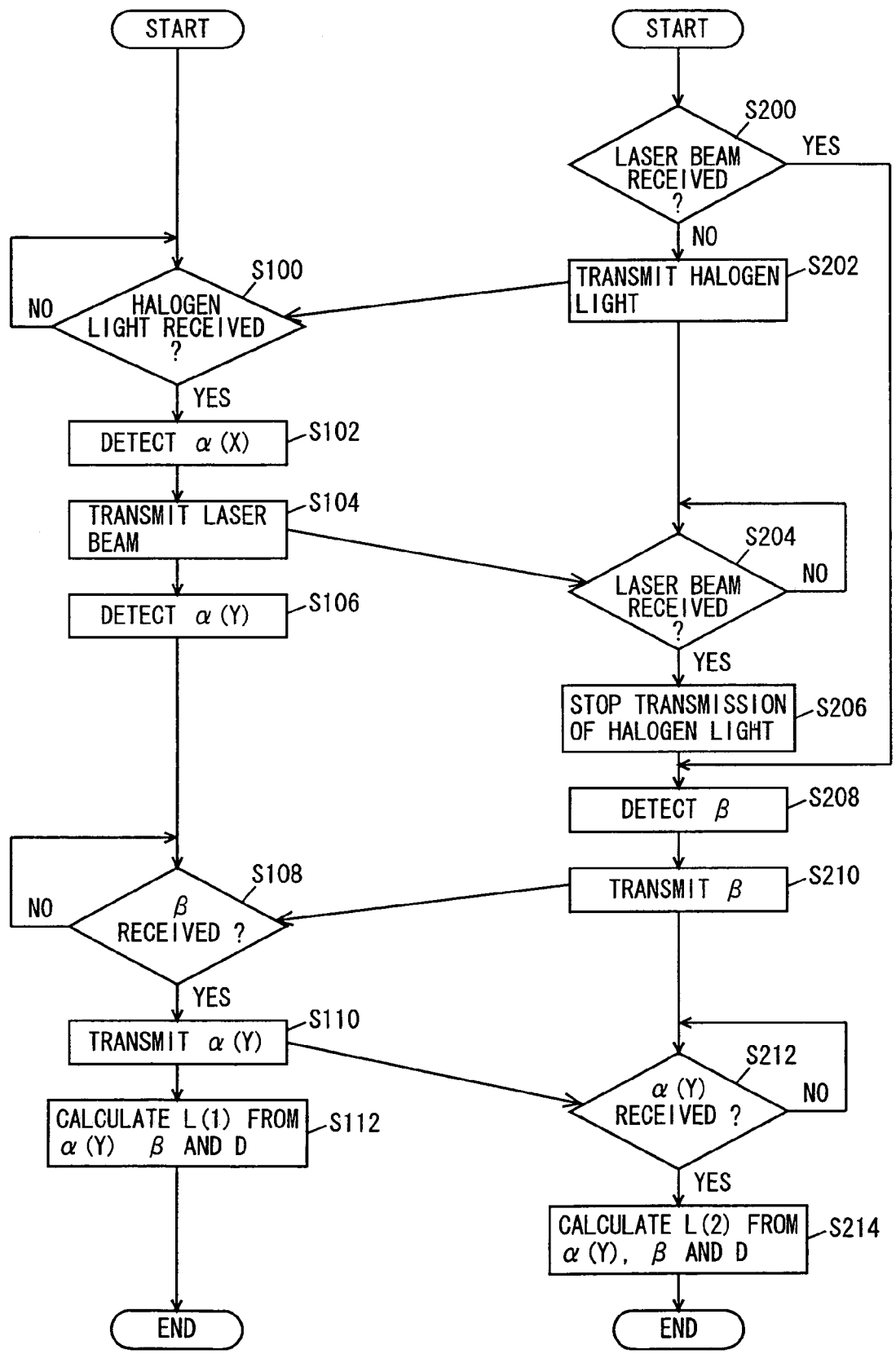
FIG. 6 is a flow chart representing a control structure of a program executed by the transmitting apparatus and the receiving apparatus of the position detecting system in accordance with the first embodiment of the present invention.

Referring to FIG. 6, control of the programs executed by transmitting apparatus 20 and receiving apparatus 30 of the position detecting system in accordance with the present embodiment will be described.

In step (hereinafter, "step" will be simply denoted by "S") 100, transmitting apparatus 20 determines whether the reflected halogen light is being received or not. If the reflected halogen light is being received, the process proceeds to S102. Otherwise, the process returns to S100, and S100 is repeated until reflected halogen light is received.

In S102, transmitting apparatus 20 detects azimuth $\alpha(X)$ at which the reflected halogen light is received. In S104, transmitting apparatus 20 emits a laser beam at the same angle as the azimuth $\alpha(X)$ at which the reflected halogen light is received. In S106, transmitting apparatus 20 detects the azimuth $\alpha(Y)$ at which the laser beam is emitted.

In S108, transmitting apparatus 20 determines whether receiving apparatus 30 has received information related to azimuth $\beta$ at which the reflected laser beam is received. If the information related to azimuth $\beta$ has been received, the process proceeds to S110. Otherwise, the process is returned to S108, and S108 is repeated until the information related to azimuth $\beta$ is received.

In S110, transmitting apparatus 20 transmits information related to azimuth $\alpha(Y)$ at which the laser beam is transmitted, to receiving apparatus 30. In S112, transmitting apparatus 20 calculates the distance L(1) between transmitting apparatus 20 and moving body 40, from azimuth $\alpha(Y)$, azimuth $\beta$ and the distance D between transmitting apparatus 20 and receiving apparatus 30.

In S200, receiving apparatus 30 determines whether the reflected laser beam is being received. If the reflected laser beam is being received, the process proceeds to S208. Otherwise, the process proceeds to S202.

In S202, receiving apparatus 30 emits the halogen light. In S204, receiving apparatus 30 determines whether the reflected laser beam is being received. If the reflected laser beam is being received, the process proceeds to S206. Otherwise, the process is returned to S204, and S204 is repeated until the reflected laser beam is received.

In S206, receiving apparatus 30 stops emission of the halogen light. In S208, receiving apparatus 30 detects azimuth β at which the reflected laser beam is received. In S210, receiving apparatus 30 transmits information related to azimuth β to transmitting apparatus 20.

In S212, receiving apparatus 30 determines whether information related to azimuth α(Y) at which the laser beam is emitted from transmitting apparatus 20 has been received or not. If the information related to azimuth α(Y) has been received, the process proceeds to S214. Otherwise, the process is returned to S212, and S212 is repeated until information related to azimuth α(Y) is received.

In S214, receiving apparatus 30 calculates the distance L(2) between receiving apparatus 30 and moving body 40, from azimuth α(Y), azimuth β and the distance D between transmitting apparatus 20 and receiving apparatus 30.

The operation of the position detecting system in accordance with the present embodiment that is based on the configuration and the control flow described above is as follows.

Assume that receiving apparatus 30 is not receiving any reflected laser beam and the position of moving body 40 is not known at present. As the reflected laser beam is not received (NO in S200), receiving apparatus 30 emits halogen light for primary detection (S202).

When the halogen light is received (YES in S100), transmitting apparatus 20 detects the azimuth α(X) at which the reflected halogen light is received (S102), transmits a laser beam at the same angle as the azimuth α(X) (S104), and detects the azimuth α(Y) at which the laser beam is transmitted (S106).

When the reflected laser beam is received (YES in S204), receiving apparatus 30 stops emission of the halogen light (S206), detects the azimuth β at which the reflected laser beam is received (S208), and transmits information related to azimuth β to transmitting apparatus 30 (S210).

When the information related to azimuth β is received (YES in S108), transmitting apparatus 20 transmits information related to azimuth α(Y) to receiving apparatus 30 (S110). Further, transmitting apparatus 20 calculates the distance L(1) between transmitting apparatus 20 and moving body 40, from the azimuth α(Y), azimuth β and the distance D between transmitting apparatus 20 and receiving apparatus 30 (S112).

When the information related to azimuth α(Y) is received from transmitting apparatus 20 (YES in S212), receiving apparatus 30 calculates the distance L(2) between transmitting apparatus 30 and moving body 40, from the azimuth α(Y), azimuth β and the distance D between transmitting apparatus 20 and receiving apparatus 30.

As described above, in the position detecting system in accordance with the present embodiment, first, non-directional halogen light is transmitted and the reflection thereof is received to detect the azimuth between the transmitting apparatus and the receiving apparatus, as the primary detection. Next, as a secondary detection, a laser beam is transmitted at the same angle as the azimuth detected in the primary detection, the azimuth between the transmitting apparatus and the moving body is detected from the angle of laser transmission, and the azimuth between the receiving apparatus and the moving body is detected from the angle of laser reception. When the distance between the transmitting apparatus and the moving body and the distance between the receiving apparatus and the moving body are calculated, azimuths that are detected in the secondary detection are used. Therefore, even when the position of the moving body is uncertain, the azimuth between the transmitting apparatus and the moving body can be detected by the primary detection. Further, by the secondary detection, the azimuth between the transmitting apparatus and the moving body, and the azimuth between the receiving apparatus and the moving body can be detected, and respective distances can be calculated. Here, the azimuth between the transmitting apparatus and the moving body is detected from the angle of laser emission. Therefore, the azimuth between the transmitting apparatus and the moving body detected by the secondary detection is free of any error generated when the laser beam that has propagated through a space is received. Thus, the position of the moving body can be detected with high accuracy.

Second Embodiment

The position detecting system in accordance with the second embodiment of the present invention has, in addition to the function of the position detecting system in accordance with the first embodiment, the function of changing the direction of laser emission along with the movement of moving body 40 and of tracking and detecting the position of moving body 40. Other hardware configuration and process flow are the same as those of the position detecting system in accordance with the first embodiment described above. Therefore, detailed description thereof will not be repeated here.

Figure 8:
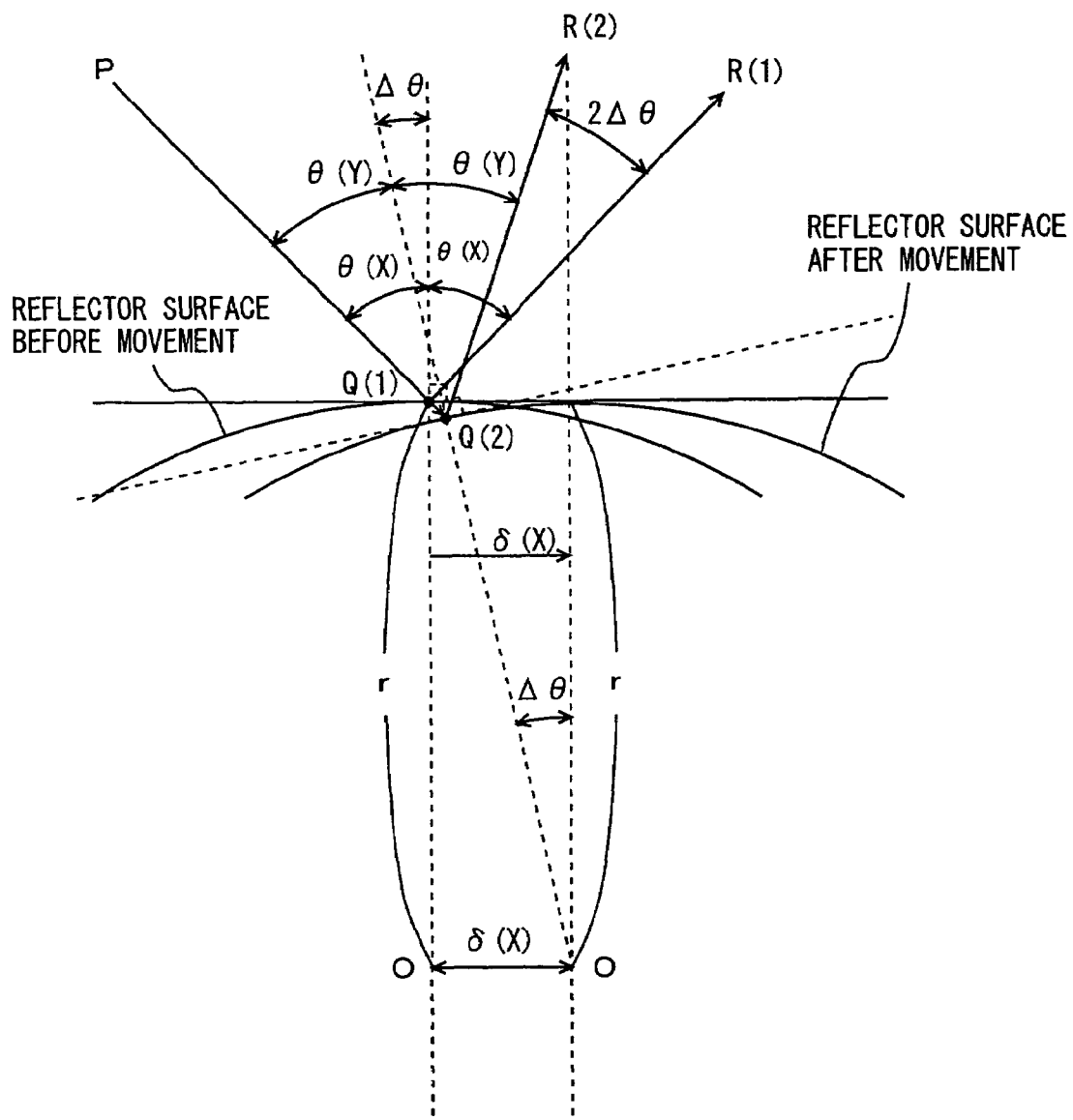

Referring to FIGS. 7 and 8, the method of tracking moving body 40 will be described. Assume that moving body 40 moves and reflector 42 moves by δ(X) in the direction of the arrow, as shown in FIG. 7. As a result of this movement, the position at which the reflected laser beam is incident on laser receiver 70 moves from R(1) to R(2), by δ(Y). When we represent the amount of change in the incident angle of the laser beam to reflector 42 as Δθ, the angle at which the reflected laser beam proceeds to laser receiver 70 changes by 2Δθ (the amount of change of azimuth β becomes 2Δθ). As to the detection of distance δ(Y), a plurality of laser receiving portions may be arranged in an array (lattice) as shown in FIG. 3B, a laser receiving portion to which the reflected laser beam enters among the laser receiving portions may be detected, and the distance δ(Y) may be detected from the distance between the laser receiving portion that has received the laser beam before movement and the laser receiving portion that receives the laser beam after movement. Alternatively, change in the amount of light received by the plurality of receiving portions may be compared to find the amount of movement. Other common techniques may be used. Therefore, detailed description thereof will not be given here.

FIG. 8 is an enlarged view of a surface of reflector 42. Assume that the laser beam transmitted from laser transmitter 50 before movement is incident on the surface Q(1) of reflector 42 from the direction P, at an incident angle of θ(X), and is reflected in a direction R(1) where laser receiver 70 exists. When reflector 42 moves by δ(X), then the laser beam transmitted from laser transmitter 50 is incident on the surface Q(2) of reflector 42 from the direction P, at an incident angle of θ(Y), and is reflected in a direction R(2).

When we represent the radius of curvature of reflector 42 by r, δ(X) <<r, and therefore, it holds that Δθ=θ(Y)−θ(X)≈δ(X)/r. As a result, the amount of change δ(Y) of the reflected laser beam reaching laser receiver 70 is given by δ(Y) ≈L·2Δθ≈2δ(X)·L/r, where L is the distance between moving body 40 (reflector 42) and laser receiver 70 and it is assumed that the amount of change thereof is negligible (assuming that L is constant). Here, Δθ≈δ(Y)/2L.

In the position detecting system in accordance with the present embodiment, receiving apparatus 30 detects δ(Y), and from the detected δ(Y), Δθ is calculated. The information of the calculated Δθ is transmitted to transmitting apparatus 20, and transmitting apparatus 20 corrects the angle of laser emission by Δθ. By continuously performing such an operation, it becomes possible to track the moving body and to constantly know the position thereof Here, δ(Y) is δ(X) multiplied by L/r, and generally L>>r. Therefore, it is possible to perceive the amount of movement δ(Y) of the reflected beam using larger amount of movement, than directly measuring the amount of movement of moving body 40. This means that even a slight movement of moving body 40 can be recognized, and therefore, tracking of the moving body with higher accuracy is possible. Here, the ratio (L/r) of enlargement of δ(Y) with respect to δ(X) may be set arbitrarily by setting the radius of curvature r of the reflector. Here, by forming the reflector to have a partial spherical surface or a partial cylindrical shape, it becomes possible to have an arbitrary radius of curvature without changing the dimension of the reflector such as the diameter or entire length, and hence, the ratio of enlargement (L/r) can be set arbitrarily.

Figure 9:
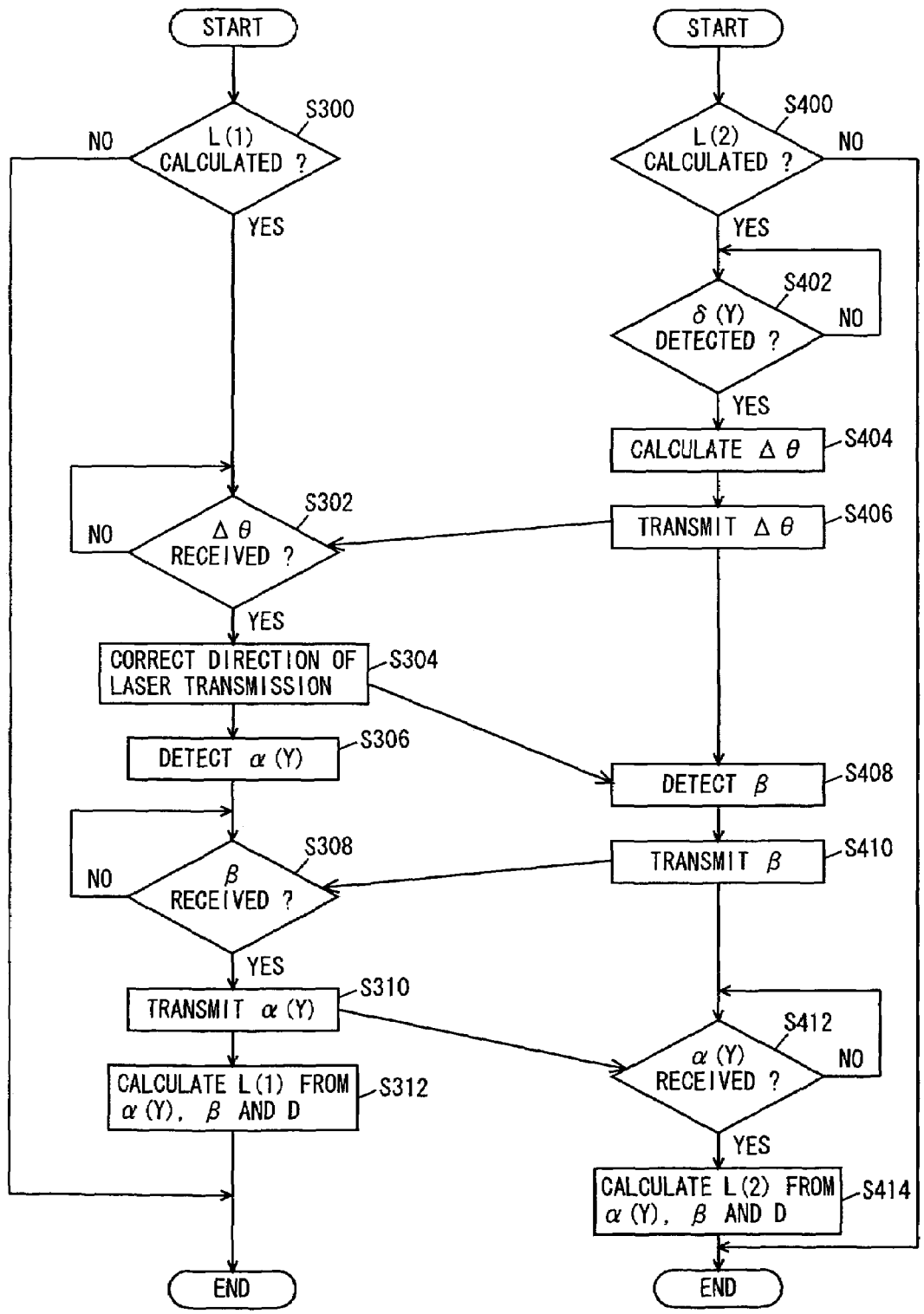
FIG. 9 is a flow chart representing a control structure of a program executed by the transmitting apparatus and the receiving apparatus of the position detecting system in accordance with the second embodiment of the present invention.

Referring to FIG. 9, the control of a program executed by transmitting apparatus 20 and receiving apparatus 30 of the position detecting system in accordance with the present embodiment for tracking and detecting the position of moving body 40 will be described. In the position detecting system in accordance with the present embodiment, the following program is executed in addition to the program executed by the position detecting system in accordance with the first embodiment described above. Therefore, description of the other program will not be repeated here.

In S300, transmitting apparatus 20 determines whether the distance L(1) between transmitting apparatus 20 and moving body 40 has been calculated or not. If the distance L(1) has been calculated, the process proceeds to S302. Otherwise, the process is terminated.

In S302, transmitting apparatus 20 determines whether information related to Δθ has been received from receiving apparatus 30 or not. If the information related to Δθ has been received, the process proceeds to S304. Otherwise, the process is returned to S302, and S302 is repeated until the information related to Δθ is received.

In S304, transmitting apparatus 20 corrects the direction of laser emission by Δθ. In S306, transmitting apparatus 20 detects the azimuth α(Y) of laser emission. In S308, transmitting apparatus 20 determines whether the information related to azimuth β of receiving the reflected laser beam has been received from receiving apparatus 30 or not. If the information related to azimuth β has been received, the process proceeds to S310. Otherwise, the process returns to S308, and S308 is repeated until the information related to azimuth β is received.

In S310, transmitting apparatus 20 transmits the azimuth α(Y) of laser emission to receiving apparatus 30. In S312, transmitting apparatus 20 calculates the distance L(1) between transmitting apparatus 20 and moving body 40, from the azimuth α(Y), azimuth β and the distance between transmitting apparatus 20 and receiving apparatus 30.

In S400, receiving apparatus 30 determines whether the distance L(2) between receiving apparatus 30 and moving body 40 has been calculated or not. If the distance L(2) has been calculated, the process proceeds to S402. Otherwise, the process is terminated.

In S402, receiving-apparatus 30 determines whether the amount of movement δ(Y) of the reflected laser beam has been detected or not. If the amount δ(Y) has been detected, the process proceeds to S404. Otherwise, the process returns to S402, and S402 is repeated until the value δ(Y) is detected.

In S404, receiving apparatus 30 calculates Δθ. In S406, receiving apparatus 30 transmits information related to Δθ to transmitting apparatus 20. In S408, receiving apparatus 30 detects the azimuth β at which the reflected laser beam is received. In S410, receiving apparatus 30 transmits the azimuth β of the reflected laser beam to transmitting apparatus 20.

In S412, receiving apparatus 30 determines whether the azimuth α(Y) at which the laser is transmitted has been received from transmitting apparatus 20 or not. If the azimuth α(Y) has been received, the process proceeds to S414. Otherwise, the process returns to S412, and S412 is repeated until the azimuth α(Y) is received.

In S414, receiving apparatus 30 calculates the distance L(2) between receiving apparatus 30 and moving body 40, from the azimuth α(Y), azimuth β and the distance D between transmitting apparatus 20 and receiving apparatus 30.

The operation of the position detecting system in accordance with the present embodiment that is based on the configuration and the control flow described above is as follows.

When the distance L(2) between receiving apparatus 30 and moving body 40 is calculated (YES in S400), receiving apparatus 30 determines whether the amount of movement δ(Y) of reflected laser beam has been detected or not (S402). When the amount of movement δ(Y) is detected (YES in S402), it calculates Δθ(S404), and transmits information related to Δθ to transmitting apparatus 20 (S406).

When the distance L(1) between transmitting apparatus 20 and moving body 40 is calculated (YES in S300) and the information related to Δθ is received (S302), transmitting apparatus 20 corrects the direction of laser emission by Δθ(S304), and detects the azimuth α(Y) at which the laser is transmitted (S306).

Receiving apparatus 30 detects the azimuth β at which the reflected laser beam is received (S408), and transmits information related to the azimuth β of reflected laser beam to transmitting apparatus 20 (S410).

When the information related to the azimuth β is received (YES in S308), transmitting apparatus 20 transmits information related to the azimuth α(Y) at which the laser is transmitted to receiving apparatus 30 (S310). Transmitting apparatus 20 calculates the distance L(1) between transmitting apparatus 20 and moving body 40, from the azimuth α(Y), azimuth β and the distance D between the transmitting apparatus 20 and receiving apparatus 30 (S312).

When the information related to the azimuth α(Y) of laser transmission is received (S412), receiving apparatus 30 calculates the distance L(2) between receiving apparatus 30 and moving body 40, from the azimuth α(Y), azimuth β and the distance D between transmitting apparatus 20 and receiving apparatus 30 (S414).

As described above, in the position detecting system in accordance with the present embodiment, the direction of laser transmission is changed as the moving body moves. Therefore, even when the position of the moving body changes, it is possible to track the moving body and to detect its position, by changing the direction of transmitting the wave.

Third Embodiment

Figure 10:
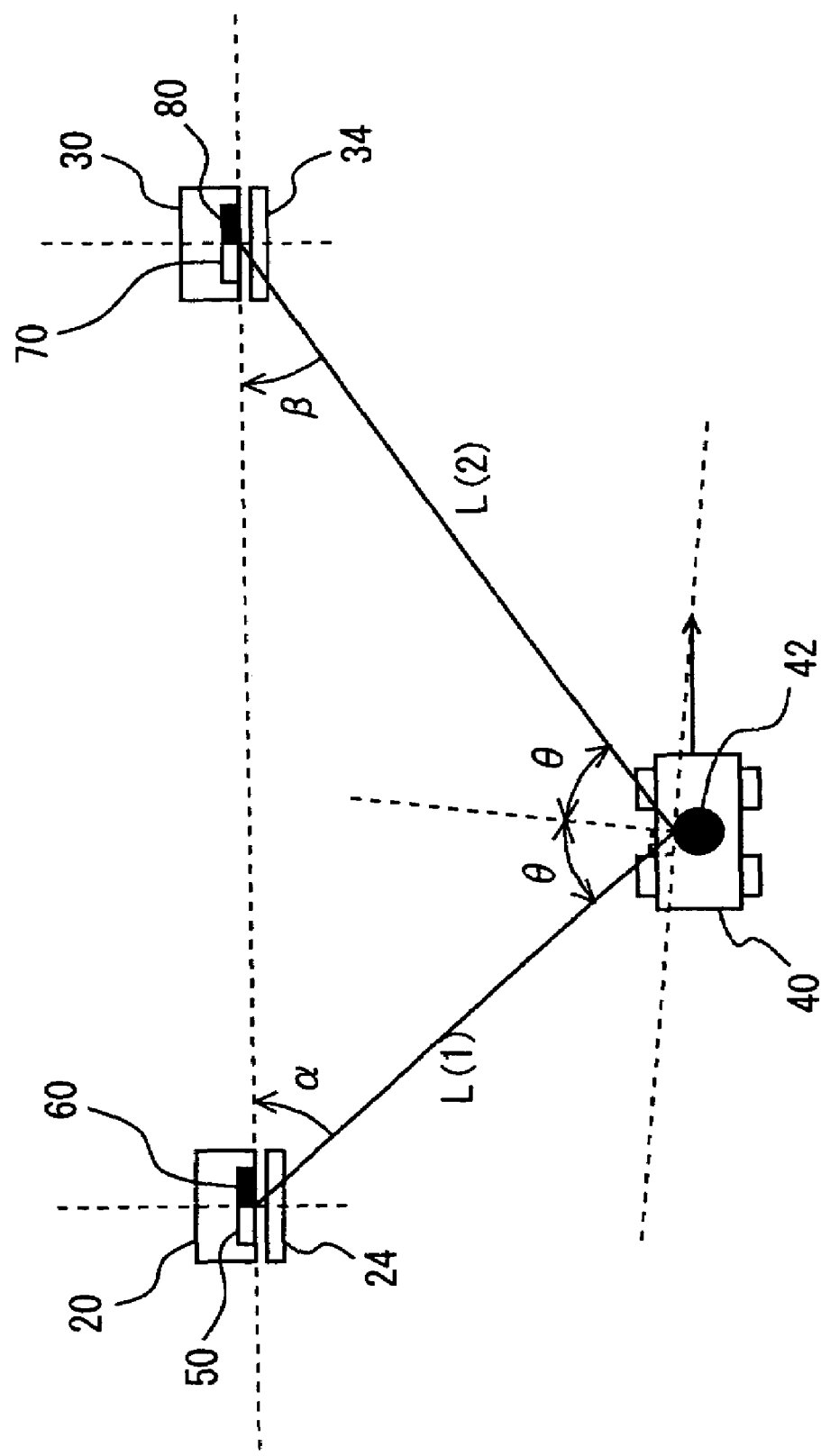
FIG. 10 represents a position detecting system and a moving body in accordance with a third embodiment of the present invention.

Referring to FIG. 10, in the position detecting system in accordance with the third embodiment of the present invention, transmitting apparatus 20 and receiving apparatus 30 include polarization filters 24 and 34, respectively, in place of the shielding plate. Other hardware configuration and process flow are the same as those of the position detecting system in accordance with the first or second embodiment described above. Therefore, detailed description thereof will not be repeated here.

Reflected light has higher ratio of polarized light that is vertical to the reflecting surface. Therefore, a direct laser beam and a reflected laser beam have different angles of linear polarization. Direct halogen light generally has no polarization, while reflected light is transmitted with polarization. Therefore, when the laser beam or halogen light is received through polarization filters 24 and 34, it becomes possible to determine whether the received light is direct light or reflected light.

Fourth Embodiment

Figure 11:
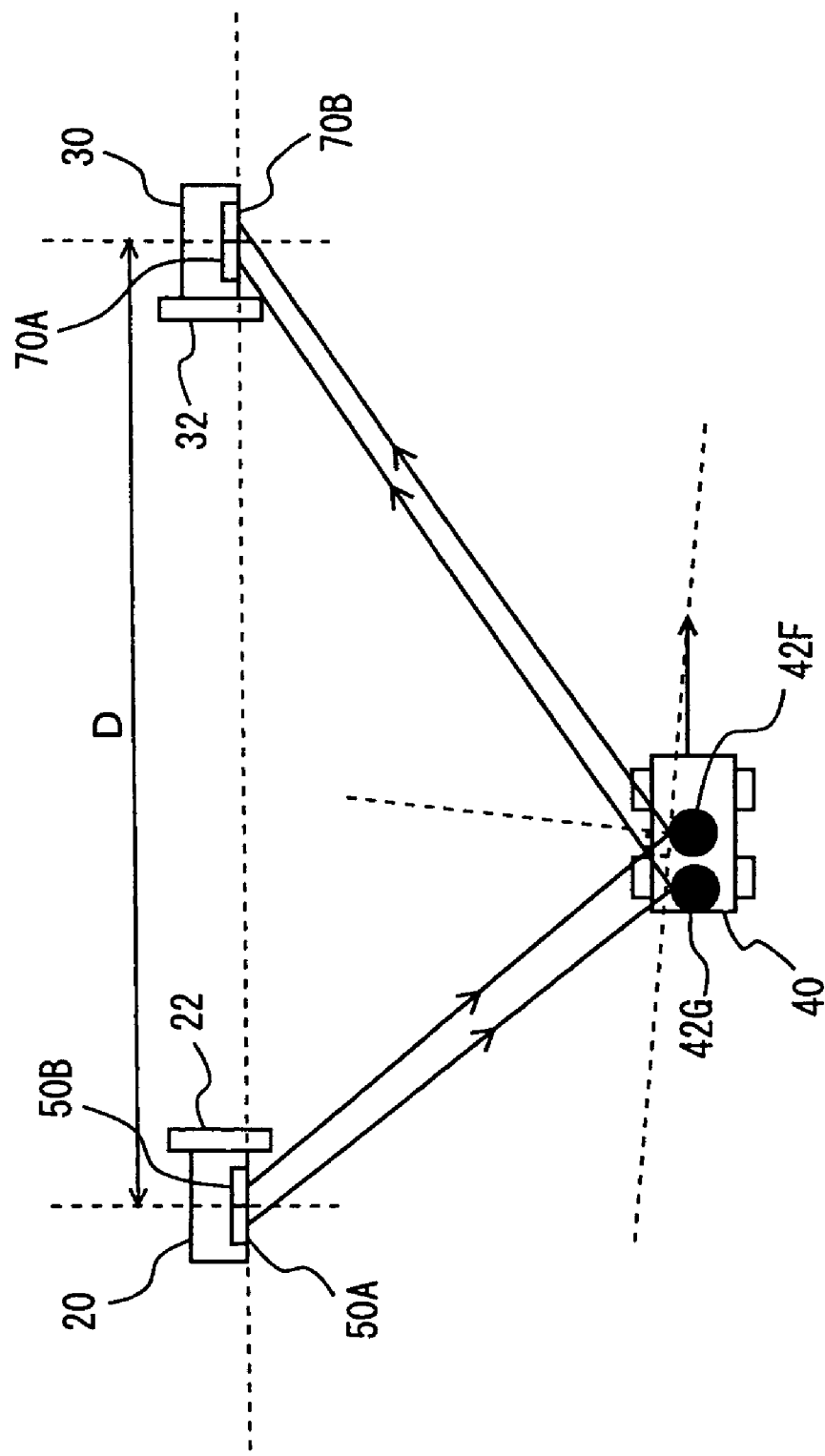
FIG. 11 represents a position detecting system and a moving body in accordance with a fourth embodiment of the present invention.

Referring to FIG. 11, transmitting apparatus 20 in accordance with the position detecting system in accordance with the fourth embodiment of the present invention includes a first laser transmitter 50A and a second laser transmitter 50B. Transmitting apparatus 30 includes a first laser receiver 70A and a second laser receiver 70B. Moving body 40 is provided with first and second reflectors 42F and 42G. The first laser transmitter 50A transmits a laser beam to the first reflector 42F, and the reflected beam therefrom is received by the first laser receiver 70A. The second laser transmitter 50B transmits a laser beam to the second reflector 42G, and the reflected beam therefrom is received by the second laser receiver 70B. Transmitting apparatus 20 and receiving apparatus 30 detect positions of the reflectors in the similar manner as in the first or second embodiment.

Other hardware configuration and process flow are the same as those of the position detecting system in accordance with the first or second embodiment described above. Therefore, detailed description thereof will not be repeated here.

As described above, in the position detecting system in accordance with the present embodiment, laser beams are transmitted separately to respective ones of a plurality of reflectors, and the reflected beams from respective reflectors are received separately. Therefore, even when the moving body does not move but rotates at the same position, the rotation of the moving body can be detected, as the positions of respective reflectors change.

Fifth Embodiment

Figure 12:
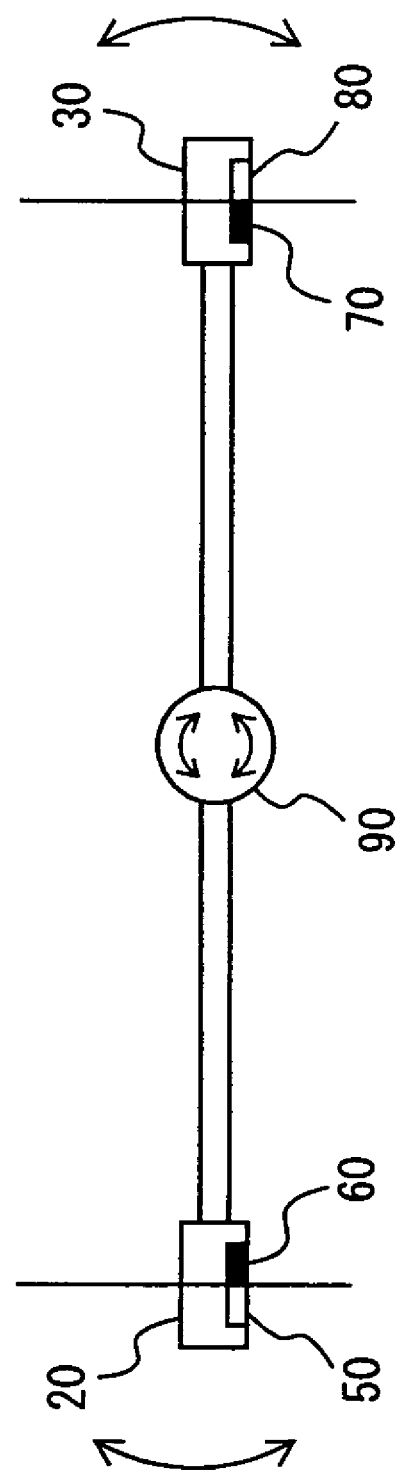
FIG. 12 represents a position detecting system in accordance with a fifth embodiment of the present invention.

Referring to FIG. 12, the position detecting system in accordance with the fifth embodiment of the present invention includes a rotating apparatus 90 rotatably provided and coupling transmitting apparatus 20 with receiving apparatus 30. Other hardware configuration and process flow are the same as those of the position detecting system in accordance with the first or second embodiment described above. Therefore, detailed description thereof will not be repeated here.

As described above, in the position detecting system of the present embodiment, rotating apparatus 90 can change the position and orientation of transmitting apparatus 20 and receiving apparatus 30. Therefore, even when the moving body moves significantly or when the moving body, the transmitting apparatus and the receiving apparatus happen to be aligned on one line, it is possible to detect the position of the moving body by changing the position and orientation of the transmitting apparatus and the receiving apparatus.

Sixth Embodiment

Figure 13A:
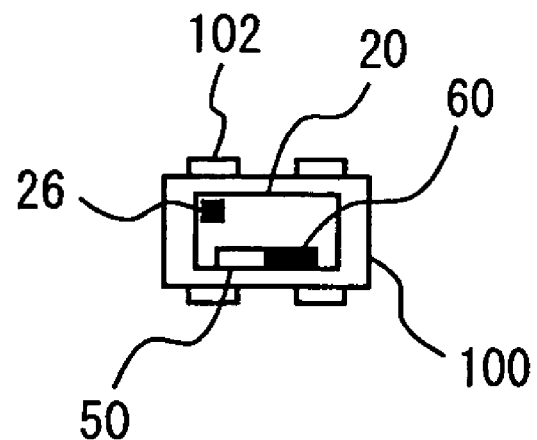
FIGS. 13A and 13B represent a position detecting system in accordance with a sixth embodiment of the present invention.
Figure 13B:
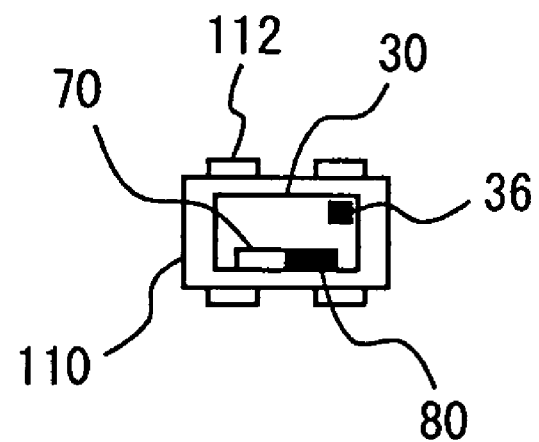

Referring to FIG. 13A, in the position detecting system in accordance with the sixth embodiment of the present invention, transmitting apparatus 20 is mounted on a first moving apparatus 100. Referring to FIG. 13B, receiving apparatus 30 is mounted on a second moving apparatus 110. Further, transmitting apparatus 20 includes a GPS (Global Positioning System) apparatus 26. Receiving apparatus 30 includes a GPS apparatus 36. Transmitting apparatus 20 detects, by GPS apparatus 26, the position of itself, and transmits information related to the position of itself to receiving apparatus 30. Similarly, receiving apparatus 30 detects, by GPS apparatus 36, the position of itself, and transmits information related to the position of itself to transmitting apparatus 20. Further, transmitting apparatus 20 calculates the distance between transmitting apparatus 20 and receiving apparatus 30 from the positions of the transmitting apparatus 20 and receiving apparatus 30. Similarly, receiving apparatus 30 calculates the distance between receiving apparatus 30 and transmitting apparatus 20 from the positions of receiving apparatus 30 and transmitting apparatus 20. The first moving apparatus 100 can move to an arbitrary position by wheels 102. The second moving apparatus 110 can move to an arbitrary position by wheels 112.

Other hardware configuration and process flow are the same as those of the position detecting system in accordance with the first or second embodiment described above. Therefore, detailed description thereof will not be repeated here. Further, general technique may be utilized as the method of detecting a position by using GPS and the method of calculating the distance between transmitting apparatus 20 and receiving apparatus 30. Therefore, detailed description thereof will not be given here.

As described above, in the position detecting system in accordance with the present embodiment, the transmitting apparatus and the receiving apparatus are mounted on the first and second moving apparatuses, respectively. Therefore, it is possible to track and detect the position of the moving body, no matter how the moving body moves.

Further, as the information related to positions of themselves are transmitted and received, it is possible to move in consideration of the position of the counterpart.

Seventh Embodiment

Figure 14A:
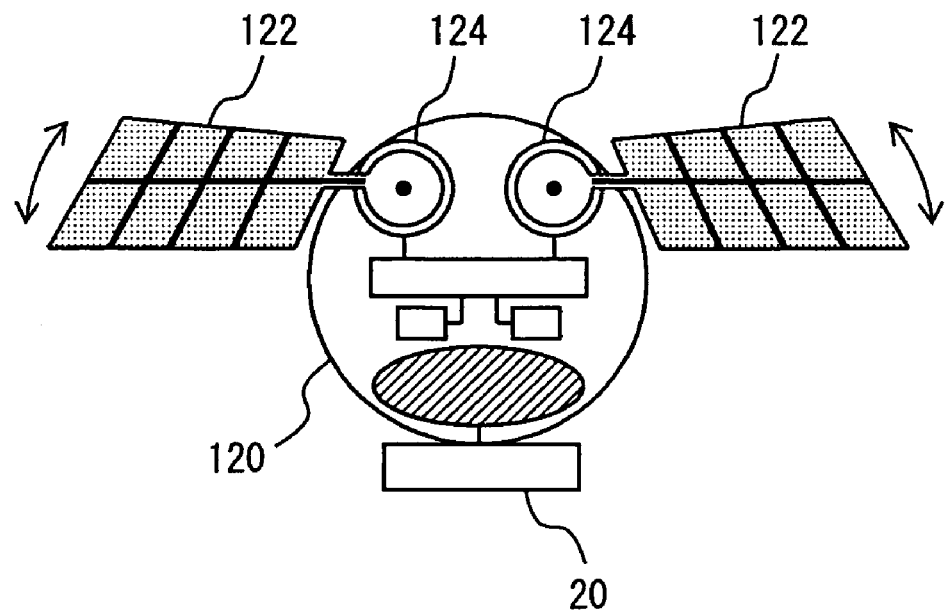
FIGS. 14A and 14B represent a position detecting system in accordance with a seventh embodiment of the present invention.
Figure 14B:
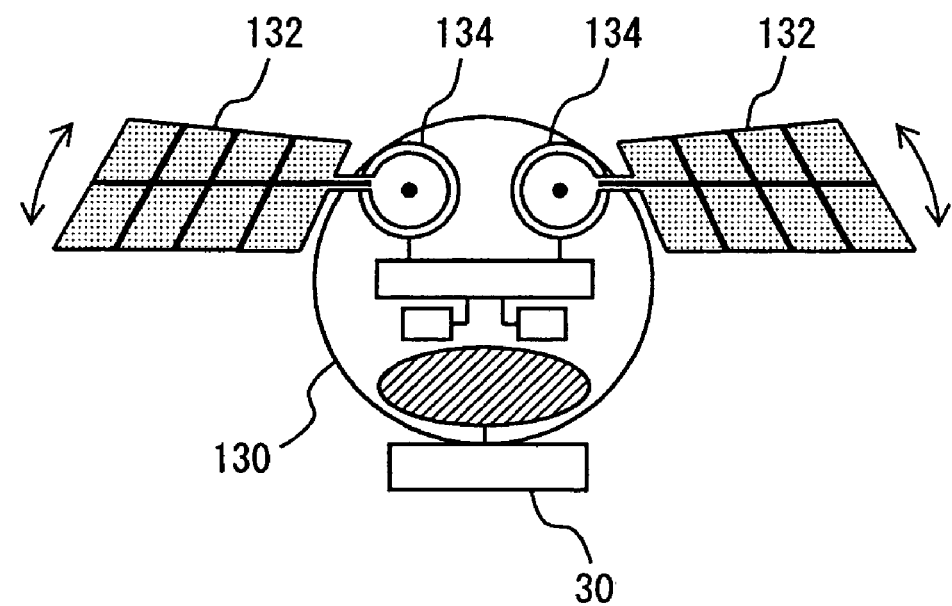

Referring to FIGS. 14A and 14B, in the position detecting system in accordance with the seventh embodiment of the present invention, transmitting apparatus 20 and receiving apparatus 30 are mounted on a first flapping robot 120 and a second flapping robot 130, respectively. The first flapping robot 120 includes wing portions 122 and actuators 124. The first flapping robot 120 can move in a space three-dimensionally, as wing portions 122 are moved up and down by actuators 124. Similarly, the second flapping robot 130 includes wing portions 132 and actuators 134. The second flapping robot 130 can move in a space three-dimensionally, as wing portions 132 are moved up and down by actuators 134.

Other hardware configuration and process flow are the same as those of the position detecting system in accordance with the sixth embodiment described above. Therefore, detailed description thereof will not be repeated here.

As described above, in the position detecting system in accordance with the present embodiment, transmitting apparatus 20 and receiving apparatus 30 are mounted on the first and second flapping robots 120 and 130, respectively. Therefore, three dimensional movement and tracking is possible no matter to what position the moving body moves.

Eighth Embodiment

Figure 15:
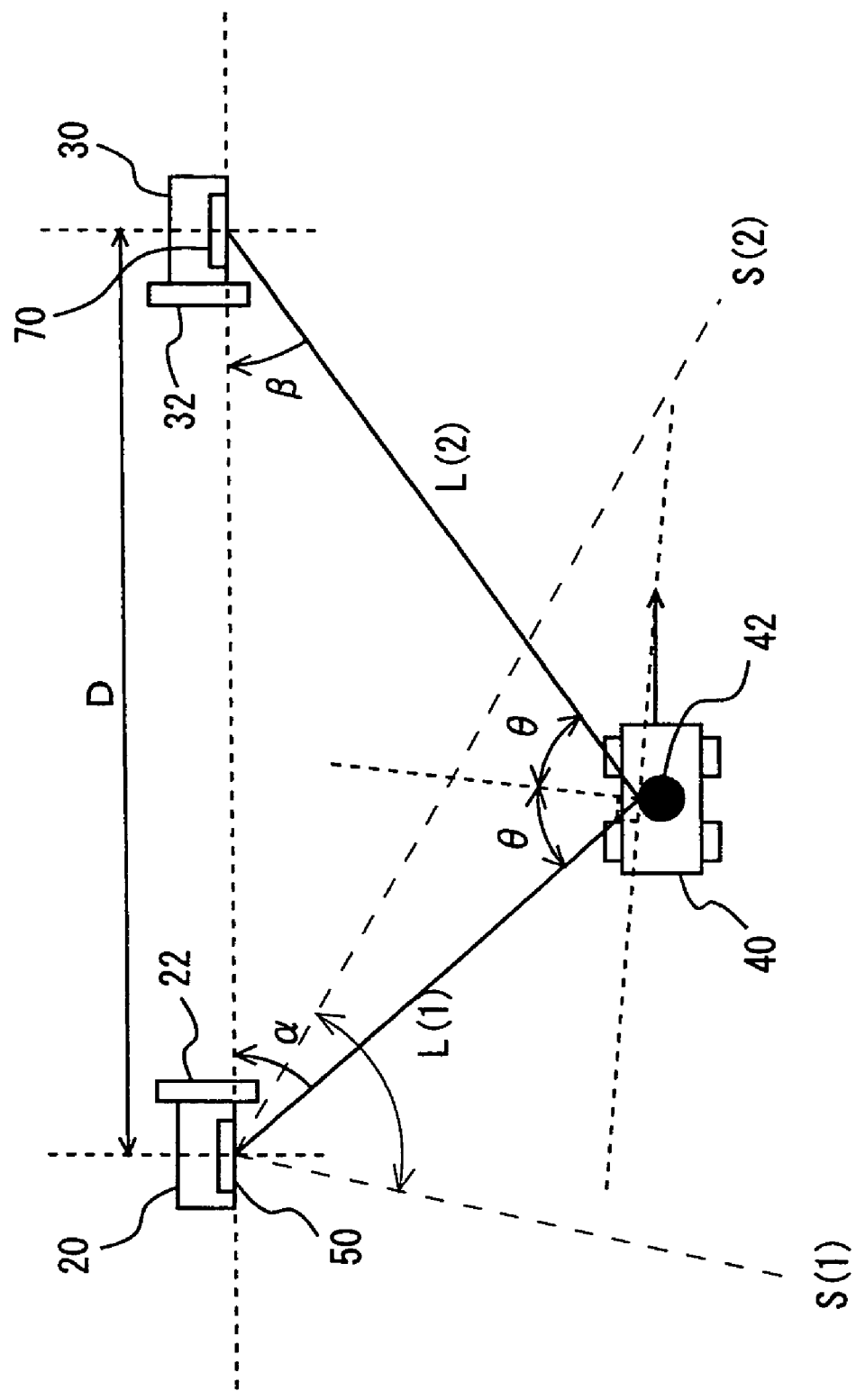
FIG. 15 represents a position detecting system in accordance with an eighth embodiment of the present invention.

Referring to FIG. 15, in the position detecting system in accordance with the eighth embodiment of the present invention, transmitting apparatus 20 does not have any halogen light receiver, and a laser beam from laser transmitter 50 sweeps from S(1) to S(2). Receiving apparatus 30 does not have a halogen light transmitter. Other hardware configuration is the same as that of the first or second embodiment described above. The process flow is the same as that of the first or second embodiment, except for the flow related to the transmission and reception of halogen light. Therefore, detailed description thereof will not be repeated here.

As described above, in the position detecting system in accordance with the present embodiment, the laser beam from the transmitting apparatus sweeps a predetermined scope. Therefore, a moving body of which position is uncertain can be searched.

Other Embodiments

Referring to FIGS. 16A, 16B, 16C and 16D, other embodiments will be described. In the following embodiments, the shape of the reflectors provided on moving body 40 is different from that of the reflectors provided on moving body 40 in accordance with any of the first to seventh embodiments described above. Other hardware configuration and process flow are the same as those of the position detecting system in accordance with the first to seventh embodiments described above. Therefore, detailed description thereof will not be repeated here.

Figure 16A:
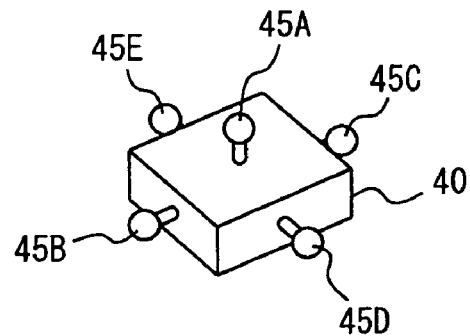
FIGS. 16A, 16B, 16C and 16D represent moving bodies of which positions are detected by the position detecting system in accordance with other embodiments of the present invention.

Referring to FIG. 16A, the moving body of which position is detected by the position detecting system in accordance with the present embodiment includes a spherical reflector 45A to 45E. Therefore, the laser beam or halogen light can be reflected the same way no matter from which direction it comes, unless shielded by the moving body itself.

Figure 16B:
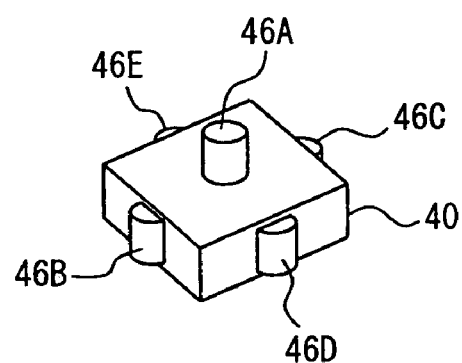

Referring to FIG. 16B, the moving body 40 of which position is detected by the position detecting system in accordance with the present embodiment includes a reflector 46A having a cylindrical surface and reflectors 46B to 46E having partial cylindrical convex surfaces. This allows simplification of the reflector structure, for such an application in that the moving body moves on a plane only. The reflector may be formed by using a partial cylindrical convex surface.

Figure 16C:
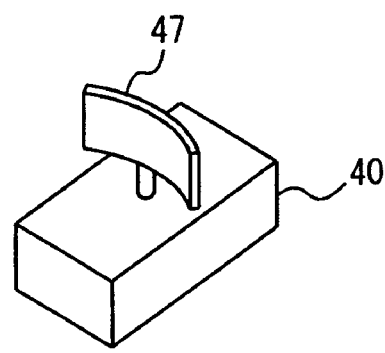

Referring to FIG. 16C, the moving body 40 of which position is detected by the position detecting system in accordance with the present embodiment includes a reflector 47 having a convex parabolic surface. This means that the radius of curvature of the reflector changes portion to portion of the reflector. Therefore, when the amount of movement of the moving body is constant, for example, it is possible to detect at which portion of the reflector the light is reflected (reflection point) from the change in the amount of movement detected by the receiving apparatus. As a result, a position of a portion of which relative position to the reflector has been known, such as the central position of the moving body, can be detected. The reflector may be formed by using a part of a convex or concave parabolic surface.

Figure 16D:
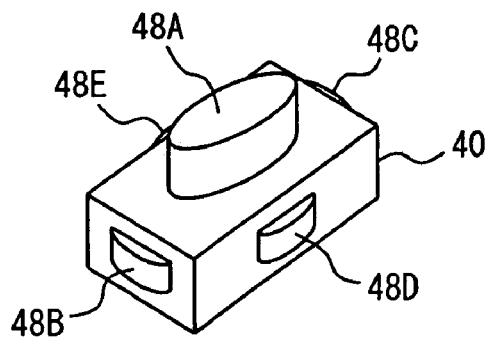

Referring to FIG. 16D, the moving body 40 of which position is detected by the position detecting system in accordance with the present embodiment includes a reflector 48A having a shape of an elliptical cylinder and reflectors 48B to 48E having a convex surface of partial elliptical cylinder. This means that the radius of curvature of the reflector changes portion to portion of the reflector. Therefore, when the amount of movement of the moving body is constant, for example, it is possible to detect at which portion of the reflector the light is reflected (reflection point) from the change in the amount of movement detected by the receiving apparatus. As a result, a position of a portion of which relative position to the reflector has been known, such as the central position of the moving body, can be detected. The reflector may be formed by using a part of a concave surface of an elliptical cylinder.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A position detecting system, comprising:
   a transmitting apparatus;
   a receiving apparatus; and
   a moving body, wherein a position of the moving body is detected by using the transmitting apparatus and the receiving apparatus; wherein
   said moving body is provided with a reflector;
   said transmitting apparatus includes transmitting means for transmitting a wave through a space, and means for detecting a direction of transmitting said wave;
   said receiving apparatus includes receiving means for receiving a reflected wave, the reflected wave corresponding to said wave reflected by said reflector, and direction detecting means for detecting a direction from which said reflected wave is received;
   said transmitting apparatus and said receiving apparatus are provided apart from each other and arranged separately;
   said reflector reflects said wave such that an amount of movement of said reflected wave incident on said receiving apparatus in a movement direction of said moving body is greater than an actual amount of movement of said moving body in the movement direction; and
   at least one of said transmitting apparatus, said receiving apparatus and said moving body detects the position of said moving body based on the direction of transmitting said wave, the direction of receiving the reflected wave and a distance between said transmitting apparatus and said receiving apparatus.

2. The position detecting system according to claim 1, wherein said transmitting apparatus and said receiving apparatus are provided to be apart from each other at a predetermined distance.

3. The position detecting system according to claim 1, wherein at least one of said transmitting apparatus and said receiving apparatus further includes moving means for changing at least one of position and orientation.

4. The position detecting system according to claim 3, wherein said moving means is three-dimensional moving means capable of moving three-dimensionally in the space.

5. The position detecting system according to claim 3, wherein
   said moving means includes first moving means for changing at least one of position and orientation of said transmitting apparatus and second moving means for changing at least one of position and orientation of said receiving apparatus; and
   each of said transmitting apparatus and receiving apparatus further includes means for transmitting and receiving to and from each other information related to a result of detection.

6. The position detecting system according to claim 3, wherein each of said transmitting apparatus and said receiving apparatus further includes means for detecting apposition of itself, and means for transmitting and receiving to and from each other information related to said position.

7. The position detecting system according to claim 1, wherein said transmitting means includes directional wave transmitting means for transmitting a directional wave;

said receiving means includes directional wave receiving means for receiving a reflected wave of the directional wave; and said direction detecting means includes directional wave direction detecting means for detecting a direction of receiving a reflected wave of the directional wave.

8. The position detecting system according to claim 7, wherein said receiving apparatus further includes non-directional wave transmitting means for transmitting a non-directional wave; and said transmitting apparatus further includes non-directional wave receiving means for receiving a reflected wave of said non-directional wave reflected by said reflector, and non-directional wave direction detecting means for detecting a direction of receiving the reflected wave of the non-directional wave.

9. The position detecting system according to claim 8, wherein said directional wave transmitting means includes a directional wave transmitting portion transmitting a directional wave;

said directional wave receiving means includes a plurality of directional wave receiving portions receiving reflected waves of the directional wave;

said directional wave direction detecting means includes means for detecting a direction at which each of said directional wave receiving means receives a reflected wave of the directional wave, means for detecting a first average direction of the directions at which said directional wave receiving portions receive the reflected waves of the directional wave;

said non-directional wave transmitting means includes non-directional wave generating portion generating a non-directional wave;

said non-directional wave receiving means includes a plurality of non-directional wave receiving portions receiving reflected waves of the non-directional wave;

said non-directional wave direction detecting means includes means for detecting a direction from which each of said non-directional wave receiving portions receives a reflected wave of said non-directional wave, and means for detecting a second average direction of the directions at which said non-directional wave receiving portions receive the reflected waves of the non-directional wave;

each of said non-directional wave receiving portions is arranged such that said second average direction matches the direction of said reflector to said directional wave transmitting portion; and each of said directional wave receiving portions is arranged such that said first average direction matches the direction of said reflector to said non-directional wave transmitting portion.

10. The position detecting system according to claim 1, wherein said transmitting means includes means for transmitting said wave in a predetermined scope.

11. The position detecting system according to claim 1, wherein said receiving apparatus further includes means for preventing direct reception of the wave transmitted from said transmitting apparatus.

12. The position detecting system according to claim 1, wherein said receiving apparatus further includes means for determining whether said wave is a reflected wave or not.

13. The position detecting system according to claim 1, wherein said receiving apparatus further includes means for detecting an amount of movement of said reflected wave; and at least one of said transmitting apparatus, said receiving apparatus and said moving body further includes means for calculating an amount of movement of said moving body from the amount of movement of said reflected wave.

14. The position detecting system according to claim 13, wherein said transmitting apparatus further includes means for changing the direction of transmitting said wave as said moving body moves.

15. The position detecting system according to claim 1, wherein said moving body is provided with a plurality of reflectors;

said transmitting means includes means for transmitting said wave separately to each of said reflectors; and said receiving means includes means for separately receiving reflected waves reflected by each of said reflectors.

16. The position detecting system according to claim 1, wherein said reflector has a curvature.

17. The position detecting system according to claim 16, wherein said reflector has a spherical shape.

18. The position detecting system according to claim 16, wherein said reflector has a cylindrical shape.

19. The position detecting system according to claim 16, wherein said reflector is a part of a spherical surface.

20. The position detecting system according to claim 16, wherein said reflector is a part of a cylindrical surface.

21. The position detecting system according to claim 16, wherein curvature of said reflector changes portion to portion.

22. The position detecting system according to claim 21, wherein said reflector has a parabolic surface.

23. The position detecting system according to claim 21, wherein said reflector has a shape of an elliptical cylinder.

24. A transmitting apparatus in the position detecting system according to claim 1.

25. A receiving apparatus in the position detecting system according to claim 1.

26. A position detecting system, comprising:

a transmitting apparatus;

a receiving apparatus; and a moving body, wherein a position of the moving body is detected by using the transmitting apparatus and the receiving apparatus; wherein said moving body is provided with a reflector;

said transmitting apparatus includes a transmitting portion transmitting said wave, and a detecting portion detecting a direction of transmitting said wave;

said receiving apparatus includes a receiving portion receiving a reflected wave, the reflected wave corresponding to said wave reflected by said reflector, and a direction detecting portion detecting a direction from which said reflected wave is received;

said transmitting apparatus and said receiving apparatus are provided apart from each other and arranged separately;

said reflector reflects said wave such that an amount of movement of said reflected wave incident on said receiving apparatus in a movement direction of said moving body is greater than an actual amount of movement of said moving body in the movement direction; and at least one of said transmitting apparatus, said receiving apparatus and said moving body detects the position of said moving body based on the direction of transmitting said wave, the direction of receiving the reflected wave and a distance between said transmitting apparatus and said receiving apparatus.

27. The position detecting system according to claim 26, wherein said transmitting apparatus and said receiving apparatus are provided to be apart from each other at a predetermined distance.

28. The position detecting system according to claim 26, wherein at least one of said transmitting apparatus and said receiving apparatus further includes a moving portion changing at least one of position and orientation.

29. The position detecting system according to claim 28, wherein said moving portion is a three-dimensional moving portion capable of moving three-dimensionally in the space.

30. The position detecting system according to claim 28, wherein
said moving portion includes a first moving portion changing at least one of position and orientation of said transmitting apparatus and a second moving portion changing at least one of position and orientation of said receiving apparatus; and
each of said transmitting apparatus and receiving apparatus further includes a transmitting and receiving portion for transmitting and receiving to and from each other information related to a result of detection.

31. The position detecting system according to claim 28, wherein each of said transmitting apparatus and said receiving apparatus further includes a position detecting portion detecting the position of itself, and a transmitting and receiving portion transmitting and receiving to and from each other information related to said position.

32. The position detecting system according to claim 26, wherein
said transmitting portion includes a directional wave transmitting portion transmitting a directional wave;
said receiving means includes a directional wave receiving portion receiving a reflected wave of the directional wave; and
said direction detecting portion includes a directional wave direction detecting portion detecting the direction of receiving a reflected wave of the directional wave.

33. The position detecting system according to claim 32, wherein
said receiving apparatus further includes a non-directional wave transmitting portion transmitting a non-directional wave; and
said transmitting apparatus further includes a non-directional wave receiving portion receiving a reflected wave of said non-directional wave reflected by said reflector, and a non-directional wave direction detecting portion detecting a direction of receiving the reflected wave of the non-directional wave.

34. The position detecting system according to claim 33, wherein
said directional wave receiving portion and said non-directional wave receiving portion are provided in plural;
said directional wave direction detecting portion includes a first receiving direction detecting portion detecting a direction at which each of said directional wave receiving portions receives a reflected wave of the directional wave, and a first average direction detecting portion detecting a first average direction of the directions at which said directional wave receiving portions receive the reflected waves of the directional wave;
said non-directional wave direction detecting portion includes a second receiving direction detecting portion detecting a direction at which each of said non-directional wave receiving portions receives a reflected wave of the non-directional wave, and a second average direction detecting portion detecting a second average direction of directions at which said non-directional wave receiving portions receive the reflected waves of the non-directional wave;
each of said non-directional wave receiving portions is arranged such that said second average direction matches the direction of said reflector to said directional wave transmitting portion; and
each of said directional wave receiving portions is arranged such that said first average direction matches the direction of said reflector to said non-directional wave transmitting portion.

35. The position detecting system according to claim 26, wherein said transmitting portion transmits said wave in a predetermined scope.

36. The position detecting system according to claim 26, wherein said receiving apparatus further includes a preventing portion preventing direct reception of the wave transmitted from said transmitting apparatus.

37. The position detecting system according to claim 26, wherein said receiving apparatus further includes a determining portion determining whether said wave is a reflected wave or not.

38. The position detecting system according to claim 26, wherein
said receiving apparatus further includes an amount of movement detecting portion detecting an amount of movement of said reflected wave; and
at least one of said transmitting apparatus, said receiving apparatus and said moving body further includes a calculating portion calculating an amount of movement of said moving body from the amount of movement of said reflected wave.

39. The position detecting system according to claim 38, wherein said transmitting apparatus further includes a changing portion changing the direction of transmitting said wave as said moving body moves.

40. The position detecting system according to claim 26, wherein
said moving body is provided with a plurality of reflectors;
said transmitting portion transmits said wave separately to each of said reflectors; and
said receiving portion separately receives reflected waves reflected by each of said reflectors.

41. The position detecting system according to claim 26, wherein said reflector has a curvature.

42. The position detecting system according to claim 41, wherein said reflector has a spherical shape.

43. The position detecting system according to claim 41, wherein said reflector has a cylindrical shape.

44. The position detecting system according to claim 41, wherein said reflector is a part of a spherical surface.

45. The position detecting system according to claim 41, wherein said reflector is a part of a cylindrical surface.

46. The position detecting system according to claim 41, wherein curvature of said reflector changes portion to portion.

47. The position detecting system according to claim 46, wherein said reflector has a parabolic surface.

48. The position detecting system according to claim 46, wherein said reflector has a shape of an elliptical cylinder.

49. A transmitting apparatus in the position detecting system according to claim 26.

50. A receiving apparatus in the position detecting system according to claim 26.

* * * * *